United States Patent
Comstock, II et al.

(10) Patent No.: US 9,267,843 B2
(45) Date of Patent: Feb. 23, 2016

(54) HYPERSPECTRAL IMAGING SYSTEMS AND METHODS FOR IMAGING A REMOTE OBJECT

(71) Applicant: Corning Incorporated, Corning, NY (US)

(72) Inventors: Lovell Elgin Comstock, II, Charlestown, NH (US); James Dixon Cornell, Rochester, NY (US); Jeffry John Santman, Westmoreland, NH (US); Kenneth Smith Woodard, New Boston, NH (US)

(73) Assignee: Corning Incorporated, Corning, NY (US)

( * ) Notice: Subject to any disclaimer, the term of this patent is extended or adjusted under 35 U.S.C. 154(b) by 171 days.

(21) Appl. No.: 14/093,814

(22) Filed: Dec. 2, 2013

(65) Prior Publication Data
US 2015/0153226 A1 Jun. 4, 2015

(51) Int. Cl.
*G01J 3/28* (2006.01)
*G01J 3/04* (2006.01)
(Continued)

(52) U.S. Cl.
CPC ............ *G01J 3/2823* (2013.01); *G01J 3/0208* (2013.01); *G01J 3/0229* (2013.01); *G01J 3/0256* (2013.01); *G01J 3/04* (2013.01); *G01J 3/2803* (2013.01); *G01J 3/36* (2013.01); *H04N 5/347* (2013.01); *H04N 9/04* (2013.01); *G01J 2003/042* (2013.01); *G01J 2003/045* (2013.01); *G01J 2003/2813* (2013.01); *G01J 2003/2826* (2013.01)

(58) Field of Classification Search
CPC .. G01J 3/04; G01J 2003/042; G01J 2003/045
See application file for complete search history.

(56) References Cited

U.S. PATENT DOCUMENTS

| | | | | |
|---|---|---|---|---|
| 4,762,412 A | * | 8/1988 | Ohkubo | ............. G01J 3/04 356/308 |
| 5,871,628 A | | 2/1999 | Dabiri et al. | |

(Continued)

FOREIGN PATENT DOCUMENTS

| | | |
|---|---|---|
| CA | 2437315 | 8/2002 |
| CN | 101268931 | 9/2008 |

(Continued)

OTHER PUBLICATIONS

Possible Prior Art—http://www.ti.com/solution/d1p_hyperspectral_imaging.

(Continued)

*Primary Examiner* — Michael A Lyons
(74) *Attorney, Agent, or Firm* — Kevin L. Bray

(57) ABSTRACT

A hyperspectral imaging system and a method are described herein for providing a hyperspectral image of an area of a remote object. In one aspect, the hyperspectral imaging system includes a fore optic with optics for acquiring and projecting an image from a remote object, a scannable slit mechanism with a plurality of slits for receiving the projected image, where the projected image simultaneously illuminates two or more of the plurality of slits, a spectrometer for receiving and dispersing images passing through the two or more simultaneously-illuminated slits, and a two-dimensional image sensor for recording images received from the spectrometer, where the images received from different slits are recorded on different sets of detection elements of the two-dimensional image sensor.

24 Claims, 15 Drawing Sheets

(51) Int. Cl.
  *H04N 9/04*   (2006.01)
  *H04N 5/347*  (2011.01)
  *G01J 3/02*   (2006.01)
  *G01J 3/36*   (2006.01)

(56) References Cited

U.S. PATENT DOCUMENTS

| | | | |
|---|---|---|---|
| 6,128,077 A * | 10/2000 | Jovin et al. | 356/310 |
| 6,160,618 A | 12/2000 | Garner | |
| 6,495,818 B1 | 12/2002 | Mao | |
| 6,504,943 B1 | 1/2003 | Sweatt et al. | |
| 6,859,275 B2 | 2/2005 | Fateley et al. | |
| 7,106,435 B2 | 9/2006 | Nelson | |
| 7,282,715 B2 | 10/2007 | Barron | |
| 7,554,667 B1 | 6/2009 | Kampe | |
| 7,583,419 B2 | 9/2009 | Kleiman | |
| 7,697,137 B2 | 4/2010 | Comstock | |
| 8,599,374 B1 | 12/2013 | Comstock et al. | |
| 2002/0141051 A1 | 10/2002 | Vogt et al. | |
| 2004/0031906 A1 | 2/2004 | Glecker | |
| 2004/0129889 A1 | 7/2004 | Barron | |
| 2004/0141213 A1 | 7/2004 | Kleiman | |
| 2004/0195510 A1 | 10/2004 | Carr et al. | |
| 2005/0243312 A1 | 11/2005 | Geshwind et al. | |
| 2006/0092414 A1 | 5/2006 | Geshwind et al. | |
| 2008/0035834 A1 | 2/2008 | Gleckler | |
| 2008/0285027 A1 | 11/2008 | Lanoue | |
| 2011/0050845 A1 | 3/2011 | Muhammed | |
| 2012/0105846 A1 * | 5/2012 | Funayama et al. | 356/326 |

FOREIGN PATENT DOCUMENTS

| | | |
|---|---|---|
| GB | 2403614 | 1/2005 |
| GB | 2403615 | 1/2005 |
| JP | 201258037 | 3/2012 |
| WO | 98/08085 | 2/1998 |
| WO | 01/81949 | 11/2001 |
| WO | 02/061483 | 8/2002 |
| WO | 2009/070121 | 6/2009 |
| WO | 2012/138499 | 10/2012 |
| WO | 2014018305 | 1/2014 |
| WO | 2014143232 | 9/2014 |

OTHER PUBLICATIONS

Machine Translation of CN101268931.
Valle T. et al.: "Multi-Slit Offner Spectrometer Development to Support GEO-CAPE Event Imager Science", Internet Citation, May 12, 2011, pp. 1-4, XP007922203 , retrieved from the Internet: URL:http://www.aquqhue.net/_. . ._files/geo-cape_Offner_Spectrometer.pdf—the whole document—Mar. 2, 2015.
International Search Report, issued in connection with corresponding PCT application No. PCT/US2014/067870 , Mar. 2, 2015.

* cited by examiner

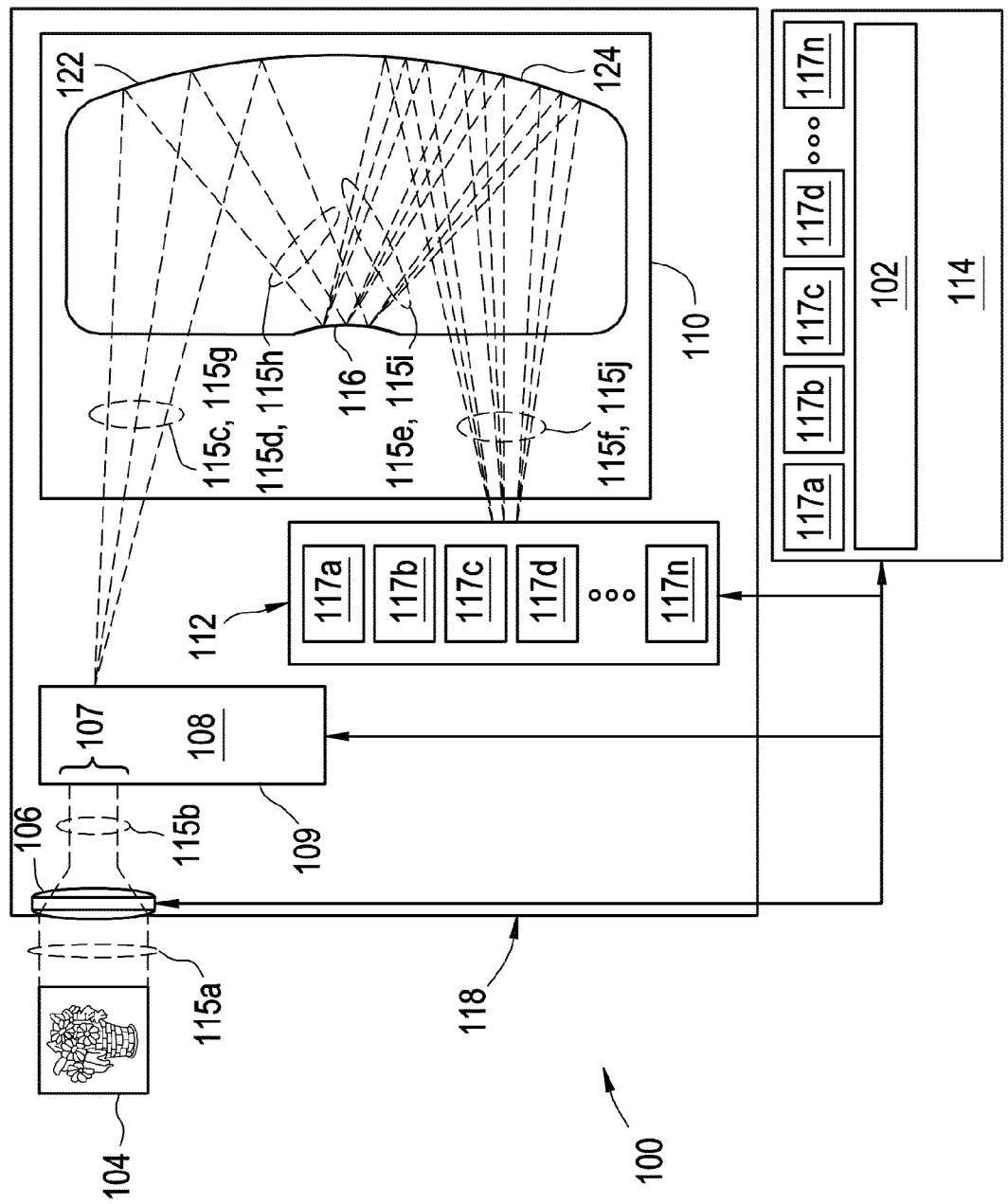

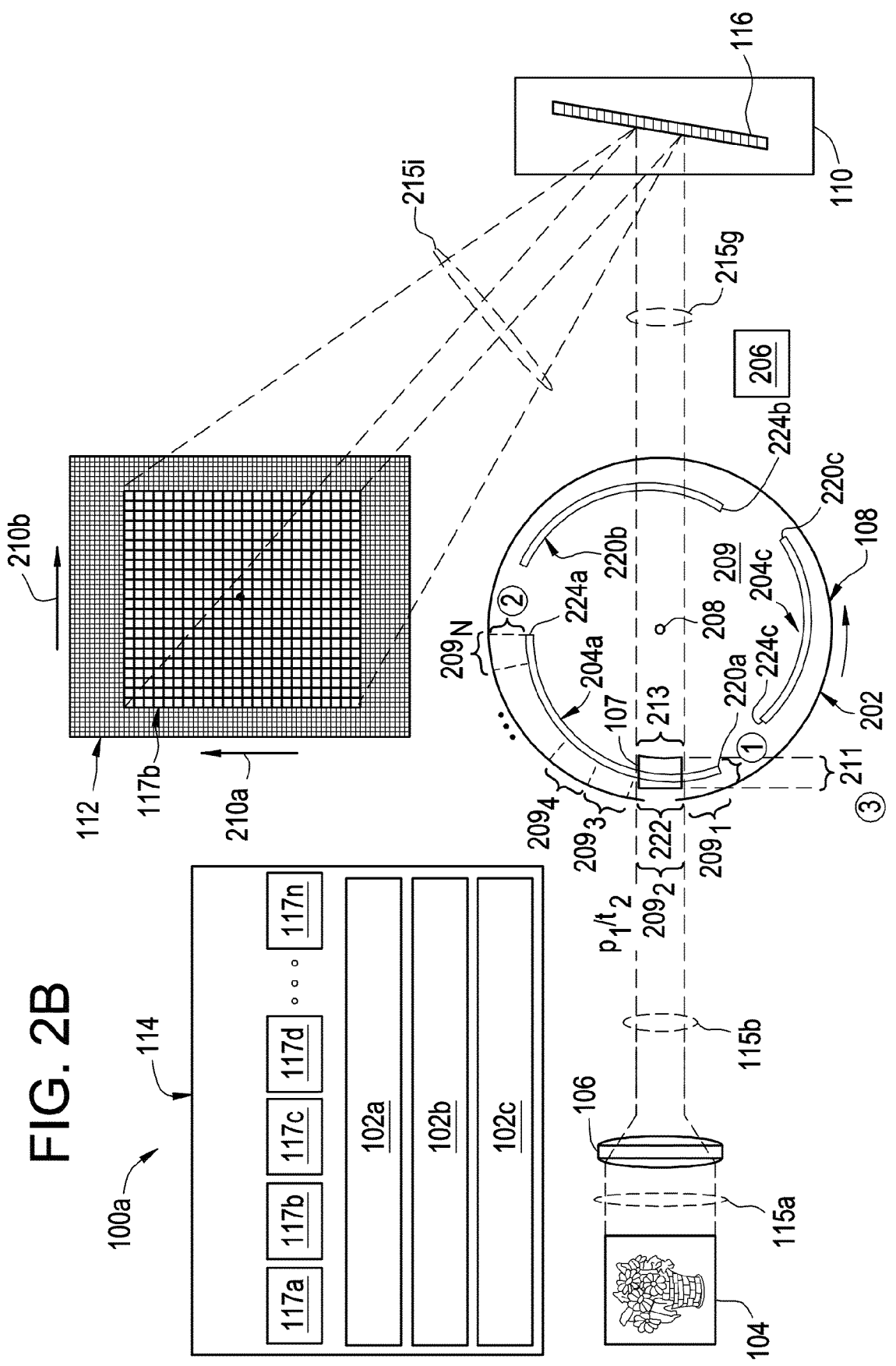

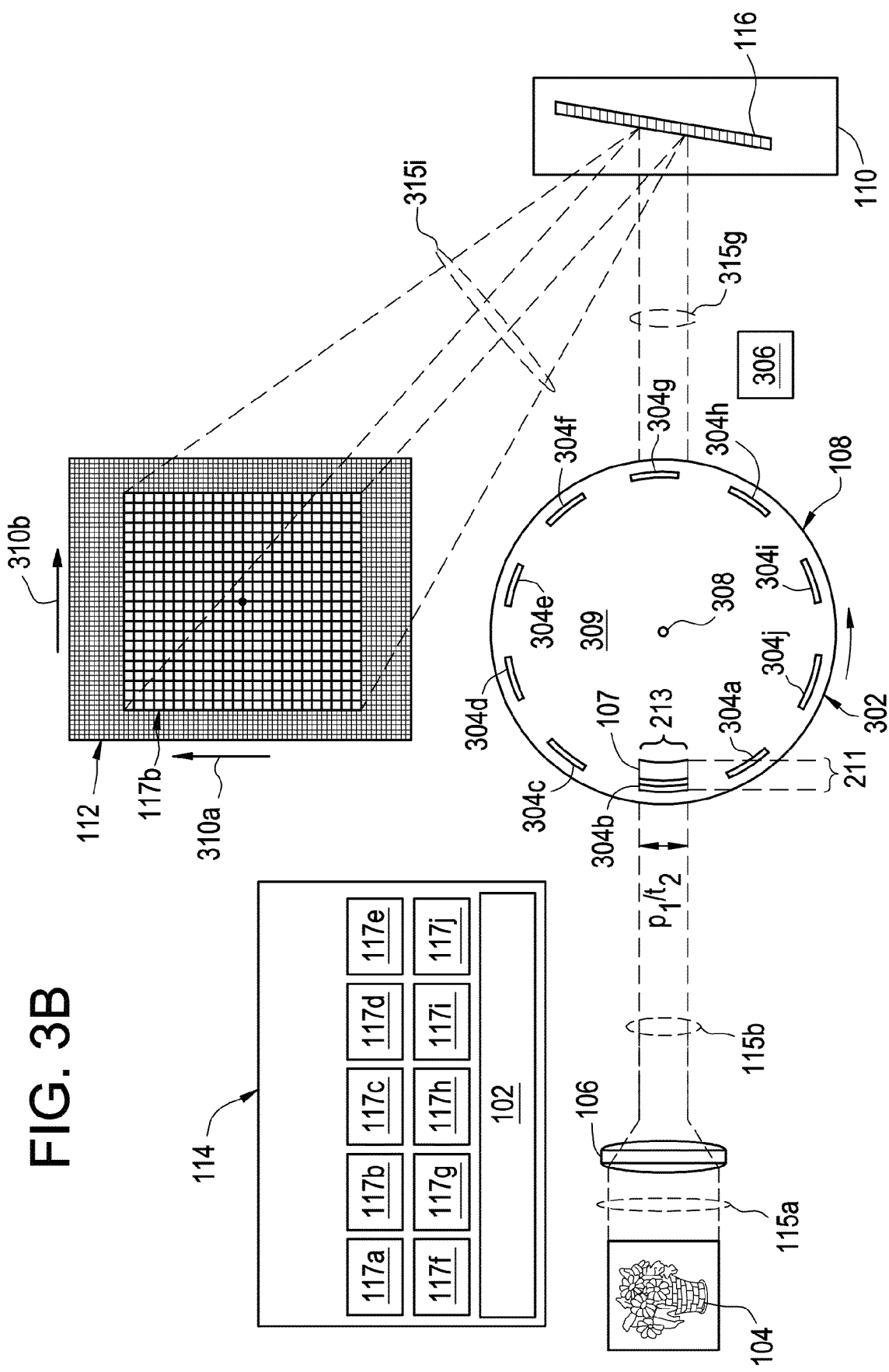

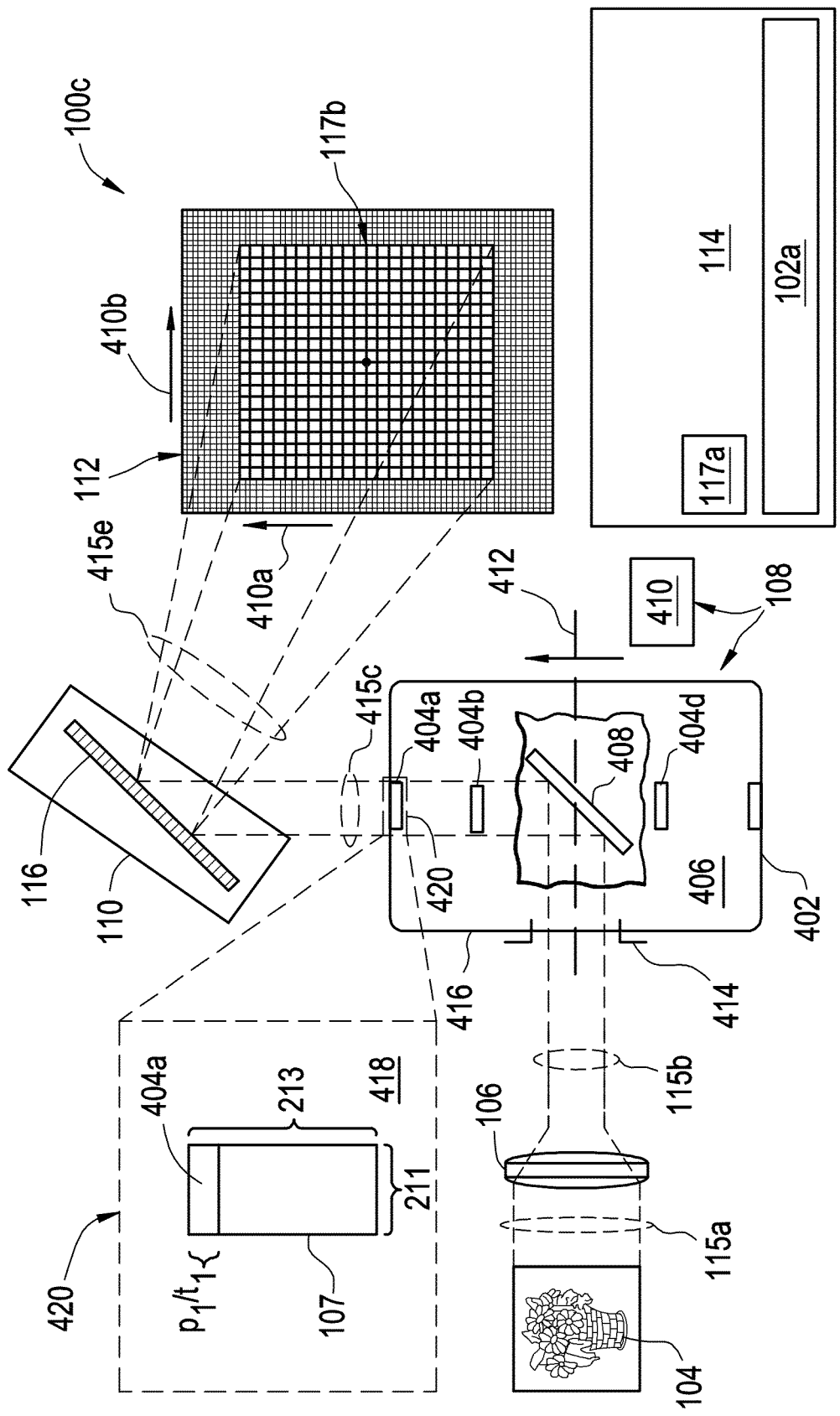

HYPERSPECTRAL IMAGING SYSTEMS AND METHODS FOR IMAGING A REMOTE OBJECT

CROSS REFERENCE TO RELATED APPLICATIONS

This application is related to application Ser. No. 13/799,958, filed Mar. 13, 2013, the disclosure of which is incorporated herein by reference in its entirety.

TECHNICAL FIELD

The present invention relates to the hyperspectral imaging field and, in particular, to a multi field of view hyperspectral imaging device and method for using the multi field of view hyperspectral imaging device. More particularly, this invention relates to a multi field of view hyperspectral imaging device with scannable slits.

BACKGROUND

A spectrometer is a device which receives a light signal as an input and produces as an output a light signal which is spread out in space according to the different wavelength components, or colors, of the input light signal. A detector attached to the spectrometer analyzes the output signal, called the spectrum, to quantify the amount of each wavelength component which is present in the input signal. One specific type of spectrometer is known as an Offner spectrometer which can be used to produce images of a remote object over a contiguous range of narrow spectral bands. This type of imaging is known as hyperspectral imaging and has recently emerged as an important part of the military/aerospace solution to airborne and spaceborne reconnaissance and remote sensing. Basically, the hyperspectral imaging system utilizes an Offner spectrometer and an advanced data processing technology to produce imagery with embedded spectral signature data. This signature data is useful in a wide-variety of applications such as target designation/recognition, missile plume identification and mine detection (for example). In addition, the hyperspectral imaging system can be used in a wide-variety of commercial applications such as cancer detection, environmental monitoring, agricultural monitoring and mineral exploration.

A conventional hyperspectral imaging system includes a fore optic for receiving an image from a remote object. The fore optic focuses the image onto a fixed slit. The slit transmits a slice of the image (line of light, trimmed image) to a spectrometer (e.g. prism, diffraction grating), which disperses the light according to wavelength and directs it to a two-dimensional image sensor (e.g. FPA detector) for recording.

One of the limitations of conventional hyperspectral imaging systems is the time required to acquire a two-dimensional image of a scene over a wide area. The limitation is a consequence of the basic design of conventional hyperspectral imaging systems. Conventional systems include a single fore optic and a single fixed slit for receiving and transmitting images to the spectrometer for dispersion and detection. A single fixed slit limits imaging to a single line of light from the remote object, which means that only a limited area of the remote object can be imaged at a time. In addition, a hyperspectral imaging system with a fixed slit is limited to filling only those pixels on the image sensor that correspond to the narrow line image defined by the fixed slit. Commercially-available image sensors typically have a much greater number of pixels than is needed to detect the dispersed light corresponding to the slice of the remote object that is transmitted as the line image originating from the fixed slit. Poor pixel utilization makes image collection inefficient.

To improve the spatial field coverage at a particular resolution, prior art systems may aggregate multiple conventional hyperspectral imaging systems. Multiple hyperspectral imaging systems can be positioned side-by-side such that the linear fields of view of each system are contiguous and imaging of contiguous slices of the remote object can occur in parallel to improve collection efficiency. This solution, however, is impractical for many applications due to the space, weight, and power constraints, as well as the costs of the multiple detectors, coolers, spectrometers, and other components needed for implementation.

There are currently two techniques for extending the hyperspectral imaging capacity of a single hyperspectral device from a single line of light (single slice) of the remote object to a two-dimensional area (multiple slices) of the remote object. The first technique involves moving the entire hyperspectral imaging system in a direction perpendicular to the fixed slit and synchronizing the image taking with that motion to obtain the hyperspectral image of a wide area of the remote object. This technique is often called the "push broom" method. The second technique involves placing a rotating mirror in front of the imaging lens of the fore optic and synchronizing image collection with the motion of the mirror to obtain the hyperspectral image of an area of the remote object.

One of the primary issues encountered in generating a hyperspectral image using the above approaches is the time required to generate a complete image. In either the push broom or rotating mirror methods, a single line of spatial image data passes through the slit and is spectrally interrogated. To sample additional line images (slices) of the scene, the field of view visible in the slit must be systematically moved to adjacent lines of the image (either by adjustment of the scanning mirror, or translation of the imager relative to the object being interrogated), and the process must be repeated until the complete scene is generated line by line. Given the desired high spatial resolution of the images, this method requires hundreds if not thousands of individual line scans to be taken one at a time and combined into a master two-dimensional image.

Although traditional hyperspectral imaging system and traditional techniques for obtaining the hyperspectral image of an area of the remote object may work well in some applications, it is desirable to develop new hyperspectral imaging systems that can be used to obtain the hyperspectral images, especially 2D or areal images, of the remote object. It is particularly desirable to develop hyperspectral imaging systems that are compact, lightweight, and capable of quickly providing an areal image of a scene over a wide area.

SUMMARY

A multi field of view hyperspectral imaging device and a method for using the same which overcomes the shortcomings of the prior art and which can be used in many applications, including SWIR, LWIR, and areal scans of remote objects, are provided by the present disclosure. The hyperspectral imaging device is equipped with multiple fields of view for simultaneously acquiring two or more independent images from a remote object as well as a scannable slit mechanism that permits translation of the fields of view to acquire images originating from different positions of the remote object. The combination of multiple fields of view and scannable slits enables rapid acquisition of areal images from the remote object.

The hyperspectral imaging device may include a fore optic, a scannable slit mechanism, a dispersing element, a two-dimensional image sensor, and a controller. The scannable slit mechanism may include a substrate with a plurality of slits. The substrate may be a disk or a drum. The slits are openings in the substrate that permit passage of light. The slits may be spiral, arcuate, straight or otherwise shaped. The substrate may be positioned at the focal plane of the fore optic and the portion of the substrate onto which the fore optic projects the image of the remote object may include two or more slits. Each of the two or more slits may simultaneously receive a different line of light from the image gathered by the fore optic from the remote object, where the different lines of light originate from a different portion of the remote object. Each slit accordingly provides a separate field of view of the remote object and the simultaneous presence of multiple slits at the focal plane of the fore optic improves image collection efficiency by permitting parallel acquisition of images of multiple lines of light.

The scannable slit mechanism may include an actuator for repositioning the substrate to present different portions of a particular plurality of slits or a different plurality of slits to the image received from the fore optic. The repositioning may include rotation, translation or other motion of the substrate. The two-dimensional image sensor may include a spatial axis and a spectral axis. The controller may control the position or configuration of the slit-containing substrate of the scannable slit mechanism. The controller may control operation of the two-dimensional image sensor and may coordinate the timing of image capture and repositioning or reconfiguration of the slits of the scannable slit mechanism.

The fore optic collects light from the remote object and focuses it on a focal plane. Two or more slits of the substrate of the scannable slit mechanism are positioned at or near the focal plane and simultaneously receive different lines of the light collected by the fore optic. The lines of light passing through the slits are directed to a dispersing element. The dispersing element may be a spectrometer equipped with a dispersing device. The dispersion device may be a grating or prism. The dispersing element receives the lines of light passing through the plurality of slits, disperses each line of light according to wavelength, and directs the dispersed lines of light to the two-dimensional image sensor. The two-dimensional image sensor forms a two-dimensional image from the dispersed lines of light that originate from the plurality of slits. A separate two-dimensional image may be formed for each dispersed line of light. The two-dimensional image sensor may include a plurality of detection elements. The two-dimensional image sensor may receive the first dispersed line of light over a first set of detection elements and the second dispersed line of light over a second set of detection elements. Two or more two-dimensional images may be combined to form a hyperspectral image.

In one aspect, the present disclosure extends to:
A multi field of view hyperspectral imaging system comprising:
a fore optic configured to receive an image from a remote object, the image including a plurality of lines of light, each of said lines of light originating from a different region of said remote object;
a scannable slit mechanism that includes a first slit and a second slit, said first slit and said second slit being positioned so that said fore optic projects said image to simultaneously illuminate said first slit and said second slit, said first slit receiving a first line of light from said fore optic and outputting a trimmed first line of light, said second slit receiving a second line of light from said fore optic and outputting a trimmed second line of light;
a spectrometer with dispersing device, said spectrometer positioned to receive and disperse said trimmed first line of light to produce a dispersed first line of light, said spectrometer positioned to receive and disperse said trimmed second line of light to produce a dispersed second line of light;
a two-dimensional image sensor with a plurality of detection elements, said two-dimensional image sensor positioned to receive said dispersed first line of light over a first set of said detection elements and to receive said dispersed second line of light over a second set of said detection elements, said two-dimensional image sensor configured to obtain a two-dimensional image of said dispersed first line of light and a two-dimensional image of said dispersed second line of light; and
an actuator configured to reconfigure said scannable slit mechanism, said reconfiguration including repositioning said first slit and said second slit.

In another aspect, the present disclosure extends to:
A hyperspectral imaging system comprising:
a fore optic configured to receive an image from a remote object, said image including a plurality of lines of light;
a scannable slit mechanism that includes a first slit and a second slit, said first slit and said second slit being positioned so that said fore optic projects said image to simultaneously illuminate said first slit and said second slit, said first slit receiving a first line of light from said fore optic and outputting a trimmed first line of light, said second slit receiving a second line of light from said fore optic and outputting a trimmed second line of light, said first line of light originating from a first portion of said remote object and said second line of light originating from a second portion of said remote object;
a spectrometer with dispersing device, said spectrometer positioned to receive and disperse said trimmed first line of light to produce a dispersed first line of light, said spectrometer positioned to receive and disperse said trimmed second line of light to produce a dispersed second line of light;
a two-dimensional image sensor with a plurality of detection elements, said two-dimensional image sensor positioned to receive said dispersed first line of light over a first set of said detection elements and to receive said dispersed second line of light over a second set of said detection elements, said two-dimensional image sensor configured to obtain a two-dimensional image of said dispersed first line of light and a two-dimensional image of said dispersed second line of light; and
an actuator configured to reconfigure said scannable slit mechanism, said reconfiguration including repositioning said first slit and said second slit.

In another aspect, the present disclosure extends to:
A method for obtaining a hyperspectral image comprising:
providing a hyperspectral imaging system comprising:
a fore optic;
a scannable slit mechanism having a first slit and a second slit;
a spectrometer with dispersing device;
a two-dimensional image sensor with a plurality of detection elements; and
an actuator;
positioning said fore optic to acquire and project an image from a remote object, said image including a plurality of lines of light;

controlling said actuator to operate said scannable slit mechanism to position said first slit and said second slit such that said first slit and said second slit are simultaneously illuminated by said projected image, said first slit being illuminated by a first line of light of said image and said second slit being illuminated by a second line of light of said image, said first line of light originating from a first portion of said remote object and said second line of light originating from a second portion of said remote object;

passing said first line of light through said first slit to said spectrometer, said spectrometer dispersing said first line of light and directing said dispersed first line of light to a first set of detection elements of said two-dimensional image sensor, said two-dimensional image sensor recording an image of said dispersed first line of light; and passing said second line of light through said second slit to said spectrometer; said spectrometer dispersing said second line of light and directing said dispersed second line of light to a second set of detection elements of said two-dimensional image sensor, said two-dimensional image sensor recording an image of said dispersed second line of light.

In one aspect of the present invention, there is a hyperspectral imaging system (and an associated method) for providing a hyperspectral image of a two-dimensional area of a remote object. The hyperspectral imaging system comprising: (a) at least one fore optic configured to receive an image associated with the remote object, where the image includes a plurality of lines of light and each of the lines of light originates from a different region of the remote object; (b) a scannable slit mechanism that includes a disk with a plurality of spiral or arcuate slits formed therein, where at least two of the slits are positioned so that the at least one fore optic projects the image to simultaneously illuminate the at least two of the slits; (c) an actuator that rotates the disk; (d) a controller configured to control the actuator such that the disc is rotated so a first portion of a first spiral or arcuate slit is positioned to allow a first line of light associated with the remote object to pass therethrough to produce a trimmed first line of light and a first portion of a second spiral or arcuate slit is positioned to allow a second line of light associated with the remote object to pass therethrough to produce a trimmed second line of light; (e) a spectrometer comprising at least a dispersion device configured to receive the trimmed first line of light and output a dispersed first line of light, and to receive the trimmed second line of light and output a dispersed second line of light; (f) a two-dimensional image sensor having a plurality of detection elements, the two-dimensional image sensor configured to receive the dispersed first line of light over a first set of detection elements and to receive the dispersed second line of light over a second set of detection elements;

In this aspect, the hyperspectral imaging system (or associated method) may further comprise: (g) the two-dimensional image sensor configured to obtain a two-dimensional image of the dispersed first line of light and a two-dimensional image of the dispersed second line of light.

In this aspect, the hyperspectral imaging system (or associated method) may further comprise: (h) the controller configured to control the actuator such that the disc is rotated so a second portion of the first spiral or arcuate slit is positioned to allow a third line of light associated with the remote object to pass therethrough to produce a trimmed third line of light and a second portion of the second spiral or arcuate slit is simultaneously positioned to allow a fourth line of light associated with the remote object to pass therethrough to produce a trimmed fourth line of light; (i) the spectrometer comprising at least the dispersion device configured to receive the trimmed third line of light and output a dispersed third line of light, and to receive the trimmed fourth line of light and output a dispersed fourth line of light; (j) the two-dimensional image sensor configured to receive the dispersed third line of light over a third set of the detection elements and to receive the dispersed fourth line of light over a fourth set of the detection elements; (k) the two-dimensional image sensor configured to obtain a two-dimensional image of the dispersed third line of light and a two-dimensional image of the dispersed fourth line of light.

In this aspect, the hyperspectral imaging system (or associated method) may further comprise: (l) the controller configured to repeatedly control the actuator such that the disc is rotated so different portions of the first and second spiral or arcuate slits are positioned to allow different lines of light associated with the light of the remote object to pass therethrough to produce different trimmed lines of light while repeatedly dispersing the different trimmed lines of light to produce different dispersed lines of light and obtaining two-dimensional images of the different dispersed lines of light from the two-dimensional image sensor.

In this aspect, the hyperspectral imaging system (or associated method) may further comprise (m) combining two or more of the two-dimensional images to provide a hyperspectral image of a two-dimensional area of the remote object.

In another aspect of the present invention, there is a hyperspectral imaging system (and an associated method) for providing a hyperspectral image of a two-dimensional area of a remote object. The hyperspectral imaging system comprising: (a) at least one fore optic configured to receive an image associated with the remote object, where the image includes a plurality of lines of light and each of the lines of light originates from a different region of the remote object; (b) a scannable slit mechanism that includes a disk with a plurality of straight slits formed therein, where at least two of the slits are positioned so that the at least one fore optic projects the image to simultaneously illuminate the at least two of the slits; (c) an actuator that rotates the disk; (d) a controller configured to control the actuator such that the disc is rotated so a first straight slit is positioned to allow a first line of light associated with the remote object to pass therethrough to produce a trimmed first line of light and a second straight slit is positioned to allow a second line of light associated with the remote object to pass therethrough to produce a trimmed second line of light; (e) a spectrometer comprising at least a dispersion device configured to receive the trimmed first line of light and output a dispersed first line of light and to receive the trimmed second line of light and output a dispersed second line of light; and (f) a two-dimensional image sensor having a plurality of detection elements, the two-dimensional image sensor configured to receive the dispersed first line of light over a first set of detection elements and to receive the dispersed second line of light over a second set of detection elements; and provide a first two dimensional image of the first dispersed line of light.

In this aspect, the hyperspectral imaging system (or associated method) may further comprise: (g) the two-dimensional image sensor configured to obtain a two dimensional image of the dispersed first line of light and a two-dimensional image of the dispersed second line of light;

In this aspect, the hyperspectral imaging system (or associated method) may further comprise: (h) the controller configured to control the actuator such that the disc is rotated so a third straight slit is positioned to allow a third line of light associated with the remote object to pass therethrough to produce a trimmed third line of light and a fourth straight slit is simultaneously positioned to allow a fourth line of light associated with the remote object to pass therethrough to produce a trimmed fourth line of light; (i) the spectrometer comprising at least the dispersion device configured to receive the trimmed third line of light and output a dispersed third line of light, and to receive the trimmed fourth line of light and output a dispersed fourth line of light; (j) the two-dimensional image sensor configured to receive the dispersed third line of light over a third set of detection elements and to receive the dispersed fourth line of light over a fourth set of detection elements; (k) the two-dimensional image sensor configured to obtain a two dimensional image of the dispersed third line of light and a two-dimensional image of the dispersed fourth line of light.

In this aspect, the hyperspectral imaging system (or associated method) may further comprise: (l) the controller configured to repeatedly control the actuator such that the disc is rotated so different pluralities of straight slits are positioned to allow different lines of light associated with the light of the remote object to pass therethrough to produce different trimmed lines of light while repeatedly dispersing the different trimmed lines of light to produce different dispersed lines of light and obtaining two-dimensional images of the different dispersed lines of light from the two-dimensional image sensor.

In this aspect, the hyperspectral imaging system (or associated method) may further comprise: (m) combining two or more of the two-dimensional images to provide a hyperspectral image of a two-dimensional area of the remote object.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein:

FIG. 1 is a diagram illustrating an exemplary hyperspectral imaging system which has a scannable slit mechanism;

FIGS. 2A-2B are several diagrams illustrating an exemplary hyperspectral imaging system in which the scannable slit mechanism is a disk;

FIGS. 3A-3B are several diagrams illustrating an exemplary hyperspectral imaging system in which the scannable slit mechanism is a disk;

FIGS. 4A-4B are several diagrams illustrating an exemplary hyperspectral imaging system in which the scannable slit mechanism is a rotating drum with a fold mirror located therein;

DETAILED DESCRIPTION

Figure 2A:
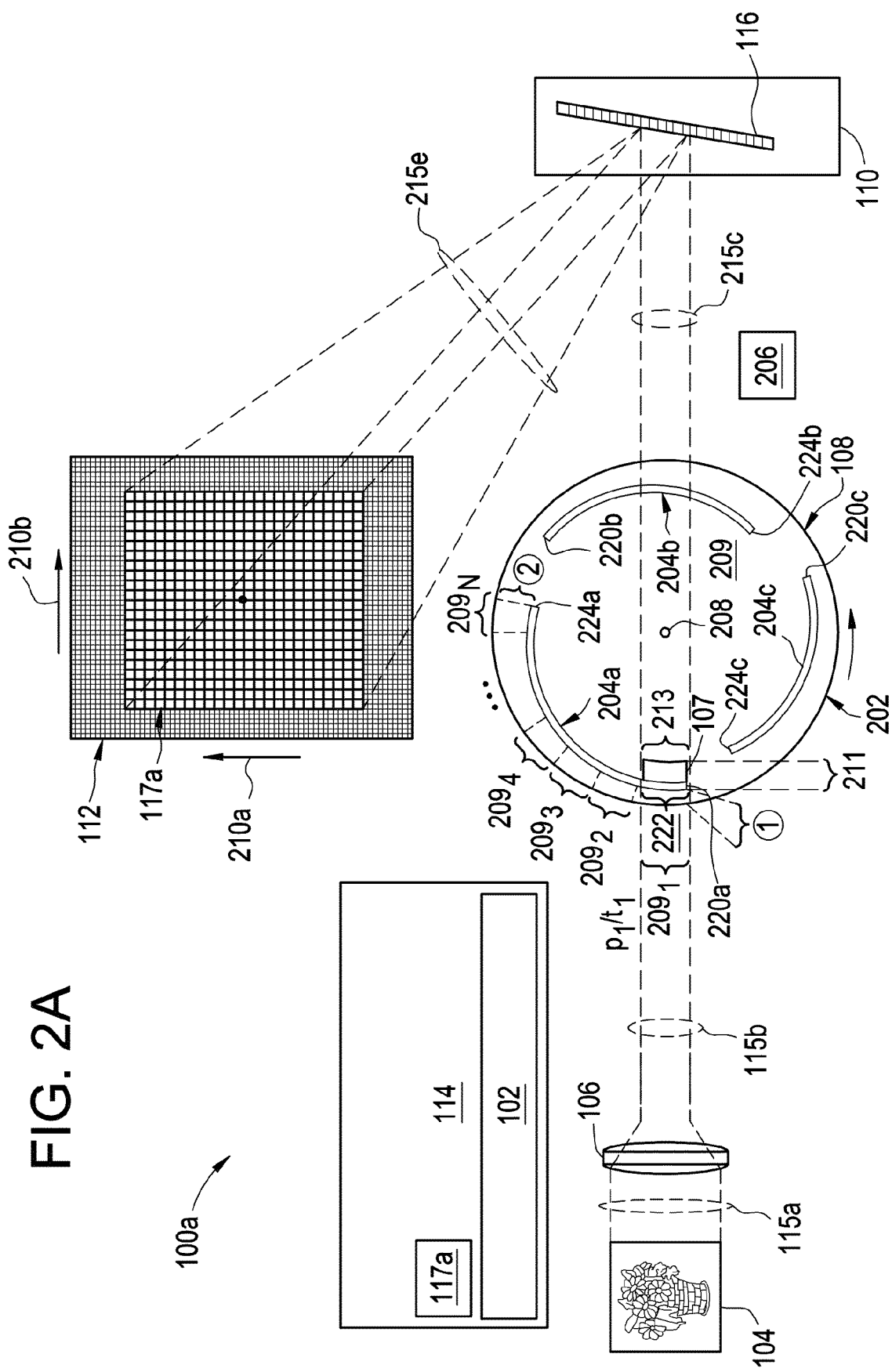

Referring to FIG. 1, there is a diagram illustrating the basic components of an exemplary hyperspectral imaging system 100 configured for providing a hyperspectral image 102 of an area of a remote object 104 in accordance with an embodiment of the present invention. The hyperspectral imaging system 100 includes a fore optic with one or more optic(s) 106, a scannable slit mechanism 108, a spectrometer 110, a two-dimensional image sensor 112, and a controller 114. The spectrometer 110 may be an Offner spectrometer (shown), a Dyson spectrometer or any one of other well known spectrometers which contain a dispersion device 116. For instance, the spectrometer 110 may contain a dispersion device 116 configured as a prism 116 which corresponds to a refractive based spectral imaging assembly. Or, the spectrometer 110 may contain a dispersion device 116 configured as a diffraction grating 116 which corresponds to a diffractive based spectral imaging assembly (shown). Furthermore, the hyperspectral imaging system 100 may include a housing 118 which encloses and supports the optic(s) 106, the scannable slit mechanism 108, the spectrometer 110, and the two-dimensional image sensor 112. In this example, the controller 114 is shown as being positioned outside of the housing 118 but is still operatively coupled to the optic(s) 106 (in order to focus the optic(s) 106), the scannable slit mechanism 108, and the two-dimensional image sensor 112. The hyperspectral imaging system 100 can incorporate other components which are well known to those skilled in the art but for clarity only those components 106, 108, 110, 112, 114, 116, and 118 which are needed to explain the present invention will be discussed in detail herein.

The hyperspectral imaging system 100 is positioned such that the optic(s) 106 receive light 115a from the remote object 104 and are configured to direct focused light 115b which represents an image 107 of the remote object 104 on the scannable slit mechanism 108. The light 115b includes a plurality of lines of light, where each line of light originates from a different portion of remote object 104. The scannable slit mechanism 108 is positioned such that the substrate 109 which receives the light 115b from the optic(s) 106 is placed at an image plane of the optic(s) 106. Substrate 109 includes a plurality of slits, where the slits are arranged so that at least two slits are simultaneously illuminated by different lines of light contained within light 115b. The at least two slits of substrate 109 of scannable slit mechanism 108 receive at least two separate lines of light from light 115b and provide at least two separate trimmed lines of light 115c, 115g to the spectrometer 110. In this example, the spectrometer 110 is configured as an Offner spectrometer and includes a first mirror 122 that receives the at least two separate trimmed lines of one light 115c, 115g from the at least two simultaneously-illuminated slits of substrate 109 of scannable slit mechanism 108 and reflects the at least two lines of light 115d, 115h to the diffraction grating 116 which directs at least two diffracted lines of light 115e, 115i to a secondary mirror 124 which reflects the at least two reflected lines of light 115f, 115j to the two-dimensional image sensor 112. The two-dimensional image sensor 112 includes a plurality of pixels and reflected lines of light 115f, 115j are received by different sets of pixels 117a, 117b and processed by the two-dimensional image sensor 112 to generate two-dimensional images. The controller 114 receives and stores the two-dimensional images 117a, 117b.

The controller may interact with the scannable slit mechanism 108 to reconfigure substrate 109. Reconfiguration of substrate 109 may include rotation or other motion that repositions the at least two slits. The repositioning of substrate 109 may position the original at least two simultaneously-illuminated slits so that different portions thereof are simultaneously illuminated. Alternatively, the repositioning of substrate 109 may remove the original at least two simultaneously-illuminated slits from the field of illumination of light 115b and replace them with a different set of at least two slits which become simultaneously illuminated. Through repositioning of substrate 109, scannable slit mechanism 108 delivers at least two different trimmed lines of light from light 115b received from remote object 104 to the spectrometer 110, which directs them as described hereinabove to two-dimensional image sensor 112 to form additional images 117c, 117d of remote object 104. The controller 114 may repeatedly reconfigure scannable slit mechanism 108 to produce a series of simultaneous trimmed images through different portions of a particular set of at least two slits and/or different sets of at least two slits to provide a plurality of images 117a, 117b, ... 117h of remote object 104. Controller 114 may also combine the two-dimensional images 117a, 117b, ... 117h to form hyperspectral image 102 of an area of the remote object 104.

A detailed discussion about the configuration and operation of several different embodiments of the hyperspectral imaging system 100 incorporating several different types of scannable slit mechanisms 108 is provided below with respect to FIGS. 2-4. For ease of discussion, the principle of operation of the scannable slit mechanism is described for the simplified situation where a single slit is illuminated by the light projected by the fore optic. In the simplified situation, a single line of light is received by the scannable slit mechanism and directed to the two-dimensional image sensor to form a single two-dimensional image. A discussion of the extension to simultaneous illumination of multiple slits and simultaneous generation of multiple two dimensional images from multiple lines of light received from multiple portions of the remote object follows.

Referring to FIGS. 2A-2B, there several diagrams illustrating the hyperspectral imaging system 100a in which the substrate of scannable slit mechanism 108 is a disk 202 with at least one spiral slit 204 (three spiral slits 204a, 204b, and 204c are shown in this example) formed therein and an actuator 206 that rotates the disk 202 about axis 208. The hyperspectral imaging system 100a includes a fore optic with optic(s) 106, the rotating disk 202, the actuator 206, the spectrometer 110 (which includes at least a dispersion device 116), the two-dimensional image sensor 112, the controller 114, and the housing 118 (not shown). It should be appreciated that the optic(s) 106, the disk 202, the spectrometer 110 with dispersion device 116, and the two-dimensional image sensor 112 would be positioned with respect to one another such that the light rays would be properly directed from one component to another component as described hereinabove. However, to help explain the various features of the hyperspectral imaging system 110a, the orientations of the optic(s) 106 with respect to the disk's surface 209 have been changed. For instance, the disk's surface 209 would in practice be facing the major surfaces of the optic(s) 106 rather than facing the reader as shown. And, the plane of rotation of the disk 202 on axis 208 would be perpendicular to the reader.

As shown in FIGS. 2A-2B, there is an example where the hyperspectral imaging system 100a is configured such that the disk 202 has a first portion $209_1$ of the spiral slit 204a in one position "p1" at a first time "t1" (see FIG. 2A) and then another portion $209_2$ of the spiral slit 204a is in position "p1" at a second time "t2" (see FIG. 2B). In FIG. 2A, the hyperspectral imaging system 100a is positioned at the first time "t1" such that the optic(s) 106 receives light 115a associated with the remote object 104 and directs focused light 115b which represents an image 107 of the remote object 104 on the disk 202, which may be located at the focal plane of optic(s) 106. In particular, the controller 114 would have interacted with the actuator 206 to rotate the disk 202 on the axis 208 such that a first portion $209_1$ of the spiral slit 204a is in position "p1" at the first time "t1". At time "t1", the first portion 209a of the spiral slit 204a is positioned at or near an image plane of the optic(s) 106 so as to pass a trimmed first line of light 215c originating from a first portion of remote object 104 to the spectrometer 110. The trimmed first line of light 215c is directed to the dispersion device 116 by way of, for example, the first mirror 122 (see FIG. 1). The spectrometer 110 can be any well known spectrometer 110 which has a dispersion device 116 (e.g., prism 116, diffraction grating 116). The dispersion device 116 generates dispersed light 215e, which is received by the two-dimensional image sensor 112 by way of, for example, the second mirror 124 (see FIG. 1). The two-dimensional image sensor 112 generates a two-dimensional image 117a which includes one axis 210a representing the spatial information of the dispersed light 215e (e.g., the zero order image of a diffracted light 215e—if the diffraction grating 116 is used) and another axis 210b representing the spectral information of the dispersed light 215e (e.g., non-zero order images of the diffracted light 215e—if the diffraction grating 116 is used). The controller 114 receives and stores the two-dimensional image 117a and interacts with the actuator 206 to rotate the disk 202 such that a second portion $209_2$ the spiral slit 204a is in position "p1" at time "t2" to pass a trimmed second line of light 215g originating from a second portion of the remote object 104 to the spectrometer 110 as discussed next.

In FIG. 2B, the hyperspectral imaging system 100a is shown configured at the second time "t2" where the controller 114 interacted with the actuator 206 to rotate the disk 202 such that the second portion $209_2$ of the spiral slit 204a is in position "p1" at time "t2" so as to pass a trimmed second line of light 215g associated with the image 107 of the remote object 104 into the spectrometer 110 which is received by the dispersion device 116 by way of, for example, the first mirror 122 (FIG. 1). As can be seen, the trimmed first line of light 215c is contiguous or substantially contiguous with the trimmed second line of light 215g associated with the image 107 of the remote object 104 so that trimmed second line of light 215g corresponds to an image of a portion of remote object 104 that is adjacent to the portion of remote object 104 associated with trimmed first line of light 215c. The dispersion device 116 generates dispersed light 215i which is received by the two-dimensional image sensor 112 by way of, for example, the second mirror 124 (FIG. 1). The two-dimensional image sensor 112 generates a two-dimensional image 117b which includes one axis 210a representing the spatial information of the dispersed light 215i (e.g., the zero order image of a diffracted light 215i—if the diffraction grating 116 is used) and another axis 210b representing the spectral information of the dispersed light 215i (e.g., non-zero order images of the diffracted light 215i—if the diffraction grating 116 is used). The controller 114 receives and stores the two-dimensional image 117b. Thereafter, the controller 114 interacts with actuator 206 to rotate the disk 202 at different times "t3", "t4" ... "tn" so that the remaining portions $209_3$, $209_4$ ... $209_n$ of the spiral slit 204a are sequentially located in position "p1" while at times "t3", "t4" ... "tn" the two-dimensional image sensor 112 is activated to obtain different two-dimensional images 117c, 117d ... 117n of different lines of dispersed light originating from remote object 104. The controller 114 combines the two-dimensional images 117a, 117b, 117c ... 117n to provide the hyperspectral image 102a of the entire image 107 associated with an area of the remote object 104. In this example, each two-dimensional image 117a, 117b, 117c ... 117n corresponds to a different line of dispersed light 215e, 215i etc. ... originating from a different portion of remote object 104 and the lines of dispersed light 215e, 215i etc. ... are contiguous with one another such than when their respective spectral images are combined, the resulting combination forms the hyperspectral image 102a which represents the image 107 of an area of the remote object 104.

The same process used to obtain the hyperspectral image 102a of the area of the remote object 104 using the first spiral slit 204a would be repeated to obtain a hyperspectral image 102b of the area of the remote object 104 using the second spiral slit 204b and then repeated to obtain a hyperspectral image 102c of the area of the remote object 104 using the third spiral slit 204c. Hence, the disk 202 having three spirals slits 204a, 204b, and 204c enables three different hyperspectral images 102a, 102b and 102c of the same image 107 of the area of the remote object 104 to be obtained per a single 360° rotation of the disk 202. In this example, the combined widths of the different portions $209_1$, $209_2$, $209_3$, $209_4$ ... $209_n$ of the first spiral slit 204a would be equal to or larger than a width 211 of the image 107 of the remote object 104. And, the height of each of the different portions $209_1$, $209_2$, $209_3$, $209_4$ ... $209_n$ of the first spiral slit 204a would be equal to or larger than a height 213 of the image 107 of the remote object 104. As disk 202 is rotated, the different portions $209_1$, $209_2$, $209_3$, $209_4$ ... $209_n$ of the first spiral slit 204a sweep across image 107 to enable acquisition of a contiguous series of images over an area of remote object 104. The second spiral slit 204b and the third spiral slit 204c would typically have the same width and height as the first spiral slit 204a. Configurations in which disk 202 included one, two or four or more spiral slits are also envisioned.

In this example, the controller 114 is able to obtain the different two-dimensional images 117a, 117b, 117c ... 117n which are combined to form one hyperspectral image 102a by using the first spiral slit 204a during a 120° rotation of the disk 202. Plus, the controller 114 obtains different two-dimensional images which are combined to form two hyperspectral images 102b and 102c by using the second spiral slit 204b and the third spiral slit 204c during the remaining 240° rotation of the disk 202. Alternatively, if the disk 202 only had one spiral slit 204 then the controller 114 would provide one hyperspectral image of the remote object 104 per a single rotation of the disk 202. Likewise, if the disk 202 had two spiral slits then the controller 114 would provide two hyperspectral images of the remote object 104 per a single rotation of the disk 202. In any case, the controller 114 can obtain the two-dimensional images 117a, 117b, 117c ... 117n at any desired data rate but typically it might be after the respective spiral slit 204a, 204b and 204c has been rotated enough so that its image (respective line of light from the image 107) on the two-dimensional image sensor 112 has moved laterally.

In the aforementioned example, the spiral slits 204a, 204b and 204c are separated from one another far enough such that the image 107 of the remote object 104 is located in only one of the spiral slits 204a, 204b or 204c at any given time. In other words, the image 107 could be entirely located in space between the spiral slits 204a and 204b, or between the spiral slits 204b and 204c, or between the spiral slits 204a and 204c. To accomplish this, the disk 202 and in particular the spiral slits 204a, 204b and 204c formed on the interior portion thereof are positioned based on the specific size and location of the image 107 which will eventually be formed by the optic(s) 106 of the fore optic. In particular, the disk 202 may have a specific diameter and the image 107 will have a predetermined width 211 and height 213 on a specific location on the surface 209 of the disk 202. Plus, the spiral slits 204a, 204b and 204c would each have one end 220a, 220b and 220c that is located a predetermined distance "1" from the edge of the disk 202 so as to be aligned with one end 222 of the image 107. In addition, the spiral slits 204a, 204b and 204c would each have an opposite end 224a, 224b and 224c that is located a predetermined distance "2" from the edge of the disk 202 so as to be aligned with an opposite end 226 of the image 107. In other words, each spiral slit 204a, 204b and 204c is sized such that the difference between distances "1" and "2" which relates to the distance between their respective ends 220a-224a, 220b-224b and 222c-224c with respect to the outer edge of the disk 202 is the same as or larger than the width 211 of the image 107 of the remote object 104.

Figure 2C:
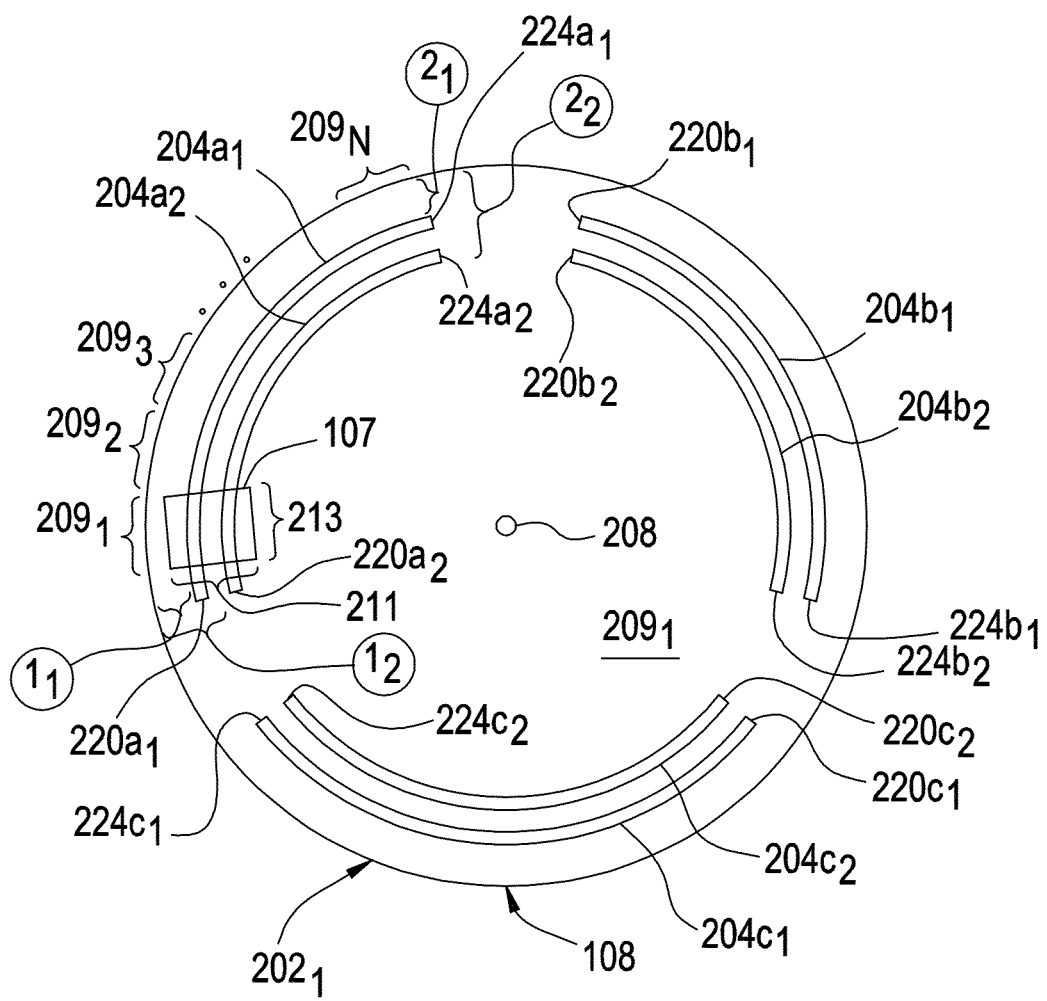
FIG. 2C depicts a disk for a scannable slit mechanism that provides for simultaneous illumination of two or more slits by the image projected by the fore optic of a hyperspectral imaging system.

In the depiction of FIGS. 2A and 2B, the plurality of slits is arranged so that only one slit at a time is illuminated as disk 202 is rotated. Alternatively, the spiral slits can be positioned with respect to one another such that two or more of the spiral slits at a given time can each have a portion which simultaneously passes a different line of light from the image 107 of the remote object 104 into the spectrometer 110. The two or more spiral slits are positioned so that each is simultaneously within the field of illumination of the fore optic to achieve simultaneous illumination. FIG. 2C shows a depiction of a disk $202_1$ for hyperspectral imaging system 100a that includes multiple slits that are arranged so that portions of two slits are simultaneously illuminated by different portions of image 107. At position $209_1$, for example, portions of each of spiral slits $204a_1$ and $204a_2$ are simultaneously illuminated. Each of the simultaneously-illuminated portions passes a trimmed line of light corresponding to a different portion of image 107 to spectrometer 110 for dispersion to two-dimensional image sensor 112. The trimmed lines of light delivered from spiral slits $204a_1$ and $204a_2$ are received by different sets of pixels contained within two-dimensional image sensor 112 and separate two dimensional images are formed from each of the trimmed lines of light. The present disclosure extends to adaptations of disk 202 that enable simultaneous illumination of three or more slits, or four or more slits, or five or more slits, etc. Such adaptations may be realized by adding additional slits to the groups of paired slits shown in FIG. 2C. Third slits $204a_3$, $204b_3$, and $204c_3$, for example could be added to the groups 204a, 204b, and 204c shown in FIG. 2C to achieve a disk in which portions of three slits are illuminated simultaneously. The two or more simultaneously-illuminated slits may be parallel. Further discussion of imaging of lines of light received from simultaneously-illuminated slits is provided hereinbelow.

Figure 2D:
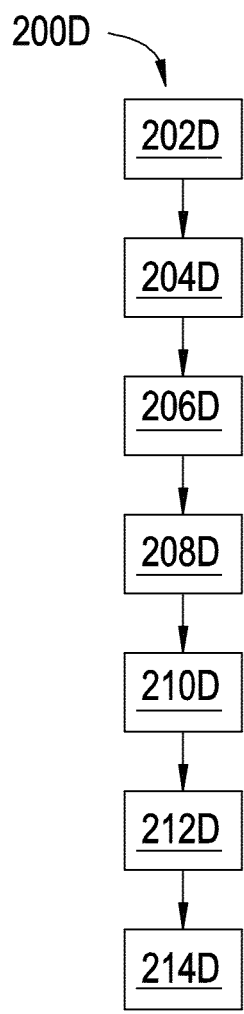
FIG. 2D is a flowchart illustrating the steps of an exemplary method for providing a hyperspectral image of a two-dimensional area of a remote object using the hyperspectral imaging system shown in FIGS. 2A-2C.

Referring to FIG. 2D, there is a flowchart illustrating the steps of an exemplary method 200D for using the hyperspectral imaging system 100a to provide the hyperspectral image 102 of the two-dimensional area 107 of the remote object 104 in accordance with the first embodiment of the present invention. The method comprises the steps of: (a) providing the hyperspectral imaging system 100a which includes a fore optic with the optic(s) 106, the rotatable disk 202 (with at least one spiral slit 204 formed therein), the actuator 206, the spectrometer 110 (which includes at least an dispersion device 116), the two-dimensional image sensor 112, and the controller 114 (step 202D); (b) positioning the optic(s) 106 to receive light 115a associated with the remote object 104 (step 204D); (c) controlling the actuator 206 such that the disc 202 is rotated so a first portion $209_1$ of the spiral slit 204 (or first portions of each of a plurality of simultaneously-illuminated slits $204_1$, $204_2$, etc.) is positioned to allow a trimmed first line of light 215c (or plurality of trimmed first lines of light, each originating from a different one of a plurality of simultaneously-illuminated slits) associated with the remote object 104 to pass there through to the spectrometer 110 comprising at least a dispersion device 116 configured to receive the trimmed first line of light 215c (or plurality of trimmed first lines of light) and output a dispersed first line of light 215e (or plurality of first dispersed lines of light) to the two-dimensional image sensor 112 (step 206D); (d) obtaining a two dimensional image 117a of the dispersed first line of light 215e (or plurality of first dispersed lines of light) from the two-dimensional image sensor 112 (step 208D); (e) controlling the actuator 206 such that the disc 202 is rotated so a second portion $209_2$ of the spiral slit 204 is positioned to allow a trimmed second line of light 215g (or plurality of trimmed second lines of light, one originating from each of a plurality of simultaneously-illuminated slits) associated with the remote object 104 to pass there through to the spectrometer 110 comprising at least the dispersion device 116 configured to receive the trimmed second line of light 215g (or plurality of trimmed second lines of light) and output a dispersed second line of light 215i (or plurality of dispersed second lines of light) to the two-dimensional image sensor 112 (step 210D); (f) obtaining a two dimensional image 117b of the dispersed second line of light 215i (or plurality of dispersed second lines of light) from the two-dimensional image sensor 112 (step 212D); and (g) repeatedly controlling the actuator 206 such that the disc 202 is rotated so different portions $209_3$, $209_4$ ... $209_n$ of the spiral slit 204 are positioned to allow different lines of light associated with the light 107 of the remote object 104 to pass there through while repeatedly obtaining two dimensional images 117c, 117d ... 117n of the different dispersed lines of light from the two-dimensional image sensor 112 and combining the first and second two dimensional images 117a and 117b and the different two dimensional images 117c, 117d ... 117n to provide the hyperspectral image 102 of the two-dimensional area of the remote object 104 (step 214D). In one example, the controller 114 can control the actuator 206 to rotate the disk 202 at a continuous constant speed while obtaining the first and second two dimensional images 117a and 117b and the different two dimensional images 117c, 117d ... 117n. In the above example, the controller 114 may include a processor that interfaces with a memory which stores processor-executable instructions to execute those processor-executable instructions to perform steps 204D, 206D, 208D, 210D, 212D, and 214D. The method of the present disclosure extends to methods that include less than all of the steps shown in FIG. 2D. Methods including subsets of any one, two, three or more steps shown in FIG. 2D are within the scope of the present disclosure.

If desired, the scanning disk 202 and actuator 206 could be added to existing designs without significant impact to the system's size. Plus, the resulting enhanced system (i.e., the hyperspectral imaging system 100a) would provide nearly 100% scan efficiency. Other traditional scanning systems like galvo driven scanners that incorporate a scan mirror in front of the fore optic, requires feedback from a scan device to know which line in the remote object is being passed to the spectrometer. However, in the hyperspectral imaging system 100a, if the two-dimensional image sensor 112 is large enough to image the zero order image and the diffracted image then the location of the zero order image can provide this information (i.e., which line in the remote object is being passed to the spectrometer) without requiring feedback from some scan device. Additionally, the traditional galvo driven scanners are a source of vibration and can have higher power requirements when compared to the constant speed rotational disk 202 used in the hyperspectral imaging system 100a. Further, traditional polygon scanners would typically have poor scan efficiency, additional reflective surfaces, and when positioned between the fore optic and the remote object would require significant increase in system size when compared to the size of the hyperspectral imaging system 100a. In the present invention, the disk 202 could be produced with conventional lithographic techniques (chrome on glass for a visible-short wave infrared (SWIR) application as an example). The disk 202 could also be produced in a metal substrate using the processes defined in the co-assigned U.S. Pat. No. 7,697,137 (the contents of which are incorporated by reference herein). Finally, the disk 202 would be driven by a simple motor 206 (actuator 206) and no speed control or angular position device is required. However, the axial position of the disk 202 needs to be nominally controlled and positioned to be within the depth of focus of the fore optic(s) 106.

Figure 3D:
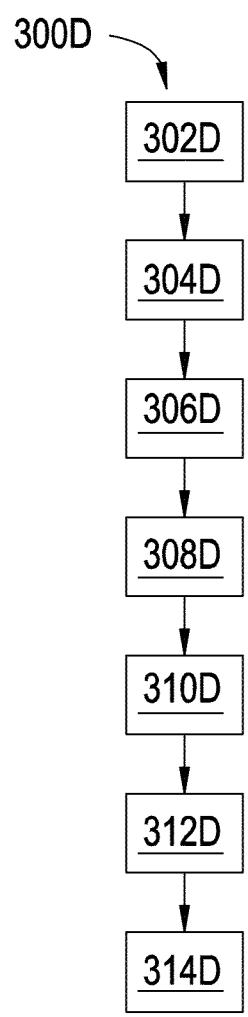
FIG. 3D is a flowchart illustrating the steps of an exemplary method for providing a hyperspectral image of a two-dimensional area of a remote object using the hyperspectral imaging system shown in FIGS. 3A-3C.
Figure 3A:
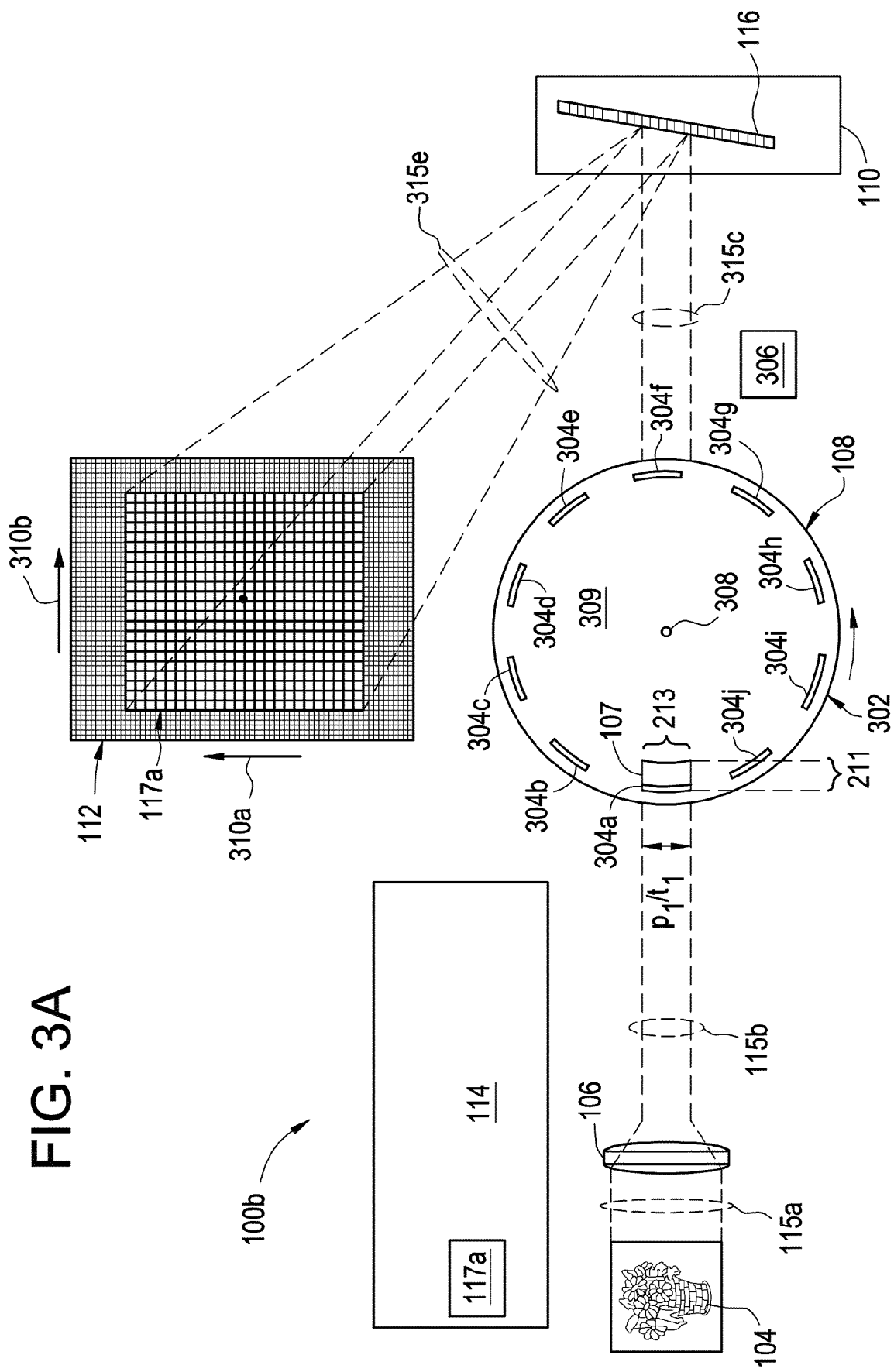

Referring to FIGS. 3A-3B, there several diagrams illustrating the hyperspectral imaging system 100b in which the scannable slit mechanism 108 is a disk 302 with multiple slits 304 (ten slits 304a, 304b, 304c, 304d, 304e, 304f, 304g, 304h, 304i, 304j are shown in this example) formed therein and an actuator 306 that rotates the disk 302 about axis 308. The slits 304 may be straight or arcuate. The hyperspectral imaging system 100b includes a fore optic with optic(s) 106, the rotating disk 302, the actuator 306, the spectrometer 110 (which includes at least a dispersion device 116), the two-dimensional image sensor 112, the controller 114, and the housing 118 (not shown). It should be appreciated that the optic(s) 106, the disk 302, the spectrometer 110 (dispersion 116), and the two-dimensional image sensor 112 would be positioned with respect to one another such that the light rays would be properly directed from one component to another component as described hereinabove. However, to help explain the various features of the hyperspectral imaging system 110b the orientations of the optic(s) 106 with respect to the disk's surface 309 have been changed. For instance, the disk's surface 309 would in practice be facing the major surfaces of the optic(s) 106 rather than facing the reader as shown. And, the plane of rotation of the disk 302 on axis 308 would be perpendicular to the reader.

As shown in FIGS. 3A-3B, there is an example where the hyperspectral imaging system 100b is configured such that the disk 302 has one slit 304a in one position "p1" at a first time "t1" (see FIG. 3A) and then the disk 302 has the next slit 304b in position "p1" at a second time "t2" (see FIG. 3B). In FIG. 3A, the hyperspectral imaging system 100b is positioned at the first time "t1" such that the optic(s) 106 receives light 115a associated with the remote object 104 and directs focused light 115b which represents an image 107 of the remote object 104 on the disk 302, which may be located at the focal place of optic(s) 106. In particular, the controller 114 would have interacted with the actuator 306 to rotate the disk 302 on the axis 308 such that the first slit 304a is in position "p1" at the first time "t1". At time "t1", the first slit 304a is positioned at or near an image plane of the optic(s) 106 so as to pass a trimmed first line of light 315c originating from a first portion of remote object 104 to the spectrometer 110, which is received by the dispersion device 116 by way of, for example, the first mirror 122 (see FIG. 1). The spectrometer 110 can be any well-known spectrometer 110 which has a dispersion device 116 (e.g., prism 116, diffraction grating 116). The dispersion device 116 generates dispersed light 315e, which is received by the two-dimensional image sensor 112 by way of, for example, the second mirror 124 (see FIG. 1). The two-dimensional image sensor 112 generates a two-dimensional image 117a which includes one axis 310a representing the spatial information of the dispersed light 315e (e.g., the zero order image of a diffracted light 315e—if the diffraction grating 116 is used) and another axis 310b representing the spectral information of the dispersed light 315e (e.g., non-zero order images of the diffracted light 315e—if the diffraction grating 116 is used). The controller 114 receives and stores the two-dimensional image 117a and then interacts with the actuator 306 to rotate the disk 302 such that the second slit 304b is in position "p1" at time "t2" to pass a second trimmed line of light 315g originating from a second portion of the remote object 104 to the spectrometer 110 as discussed next.

In FIG. 3B, the hyperspectral imaging system 100b is shown configured at the second time "t2" where the controller 114 interacted with the actuator 306 to rotate the disk 302 such that the second slit 304b is in position "p1" at time "t2" so as to pass a trimmed second line of light 315g associated with the image 107 of the remote object 104 into the spectrometer 110 which is received by the dispersion device 116 by way of, for example, the first mirror 122 (FIG. 1). As can be seen, the trimmed first line of light 315c is contiguous or substantially contiguous with the trimmed second line of light 315g associated with the image 107 of the remote object 104 so that trimmed second line of light 315g corresponds to an image of a portion of remote object 104 that is adjacent to the portion of remote object 104 associated with trimmed first line of light 315c. The dispersion device 116 generates dispersed light 315i, which is received by the two-dimensional image sensor 112 by way of, for example, the second mirror 124 (FIG. 1). The two-dimensional image sensor 112 generates a two-dimensional image 117b which includes one axis 310a representing the spatial information of the dispersed light 315i (e.g., the zero order image of a diffracted light 315i—if the diffraction grating 116 is used) and another axis 310b representing the spectral information of the dispersed light 315i (e.g., non-zero order images of the diffracted light 315i—if the diffraction grating 116 is used). The controller 114 receives and stores the two-dimensional image 117b.

Thereafter, the controller 114 interacts with actuator 306 to rotate the disk 302 at different times "t3", "t4", "t5", "t6", "t7", "t8", "t9", "t10" so that the remaining slits 304c, 304d, 304e, 304f, 304g, 304h, 304i, 304j are sequentially located in position "p1" at times "t3", "t4", "t5", "t6", "t7", "t8", "t9", "t10" during which the controller 114 interacts with the two-dimensional image sensor 112 to obtain different two-dimensional images 117c, 117d, 117e, 117f, 117g, 117h, 117i, 117j of the remote object 104. The controller 114 combines the two-dimensional images 117a, 117b, 117c, 117d, 117e, 117f, 117g, 117h, 117i, 117j to provide the hyperspectral image 102 of the entire image 107 associated with an area of the remote object 104. In this example, each two-dimensional image 117a, 117b, 117c, 117d, 117e, 117f, 117g, 117h, 117i, 117j corresponds to a different dispersed line of light 315e, 315i etc. . . . originating from different portions of remote object 104 and the dispersed lines of light 315e, 315i etc. . . . are contiguous with one another such than when their respective spectral images are combined the resulting combination forms the hyperspectral image 102 associated with the entire image 107 of the area of the remote object 104.

As can be seen, the disk 302 having the multiple slits 304a, 304b, 304c, 304d, 304e, 304f, 304g, 304h, 304i, 304j enables the generation of the hyperspectral image 102 that is associated with the image 107 of an area of the remote object 104 to be obtained per a single 360° rotation of the disk 302. In this example, the height of each of the slits 304a, 304b, 304c, 304d, 304e, 304f, 304g, 304h, 304i, 304j would be equal to or larger than a height 213 of the image 107 of the remote object 104. And, the combined widths of the slits 304a, 304b, 304c, 304d, 304e, 304f, 304g, 304h, 304i, 304j would be equal to or larger than a width 211 of the image 107 of the remote object 104. As shown, the slits 304a, 304b, 304c, 304d, 304e, 304f, 304g, 304h, 304i, 304j would be positioned in an offset manner on the surface 309 of the disk 302 at different distances from the edge of disk 302 such that when the first slit 302a is in position "p1" it would allow the trimmed first line of light 315c from a first portion of the image 107 to pass there through and when the second slit 302b is in position "p1" it would allow the trimmed second line of light 315g from a portion congruous with the first portion of the image 107 to pass there through and so on for the remaining slits 304c, 304d, 304e, 304f, 304g, 304h, 304i, 304j. In this manner, after all of the slits 304a, 304b, 304c, 304d, 304e, 304f, 304g, 304h, 304i, 304j have been in position "p1" then all of the trimmed lines of light 315c, 315g etc. . . . which pass through them are contiguous to one another such that if all the trimmed lines of lights 315c, 315g etc. . . . are combined they would encompass the entire image 107.

It should be appreciated that any number of slits 304 could be formed on the disk 302, where each slit 304 would have the same or different widths so long as all of the widths of the slits 304 when combined would be equal to or larger than the width 211 of the image 107 of the remote object 104.

In the aforementioned example, the controller 114 obtains "snapshots" of the two-dimensional images 117a, 117b, 117c, 117d, 117e, 117f, 117g, 117h, 117i, 117j when the corresponding individual slits 304a, 304b, 304c, 304d, 304e, 304f, 304g, 304h, 304i, 304j are in position "p1" and aligned parallel with the two-dimensional image sensor 112. Hence, the controller 114 would obtain a "snapshot" of each of the two-dimensional images 117a, 117b, 117c, 117d, 117e, 117f, 117g, 117h, 117i, 117j after rotating the disk 306 about the axis 308 for 36° and in between these 36° rotations no data would be taken from the two-dimensional image sensor 112. As a result, the hyperspectral imaging system 100b does not have 100% scan efficiency since no data is taken from the two-dimensional image sensor 112 when the slits 304a, 304b, 304c, 304d, 304e, 304f, 304g, 304h, 304i, 304j are not in position "p1". The controller 114 can obtain the "snapshots" of the two-dimensional images 117a, 117b, 117c, 117d, 117e, 117f, 117g, 117h, 117i, 117j without having to stop the rotation of the disk 306 because the controller 114 would interact with and take the data from the from the two-dimensional image sensor 112 whenever the slits 304a, 304b, 304c, 304d, 304e, 304f, 304g, 304h, 304i, 304j are in position "p1".

Figure 3C:
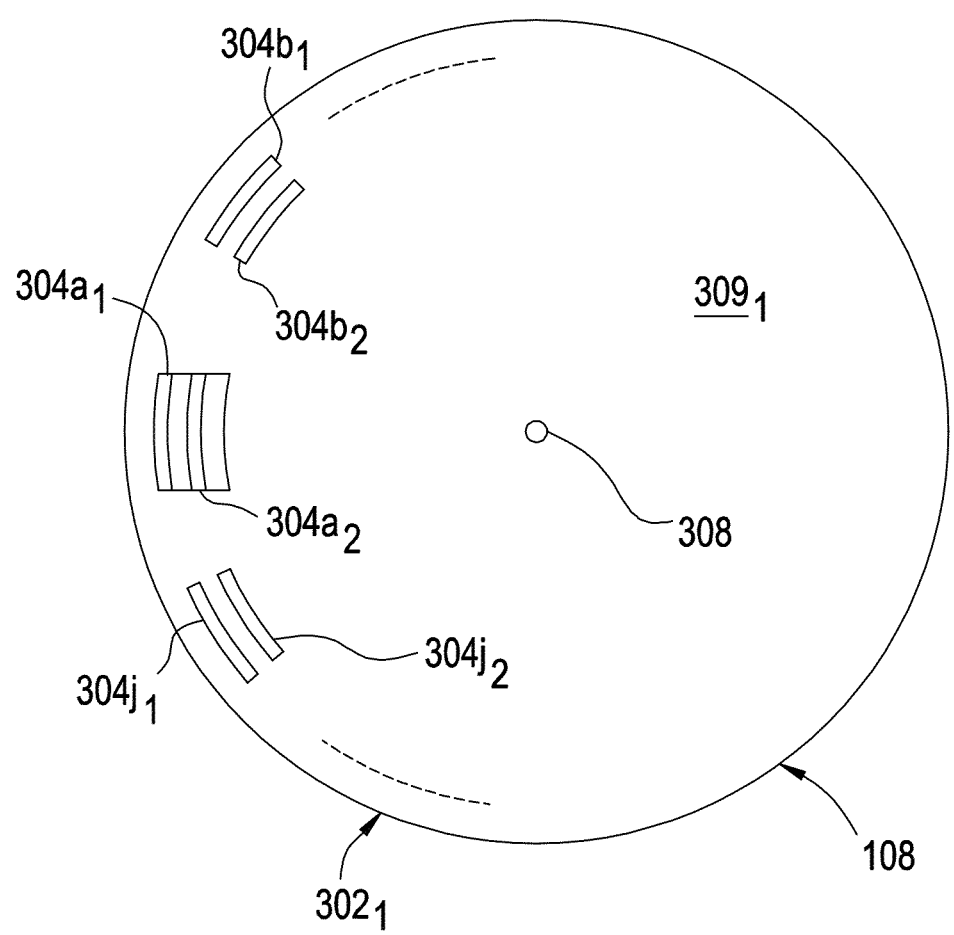
FIG. 3C depicts a disk for a scannable slit mechanism that provides for simultaneous illumination of two or more slits by the image projected by the fore optic of a hyperspectral imaging system.

In the depiction of FIGS. 3A and 3B, the plurality of slits is arranged so that only one slit at a time is illuminated as disk 302 is rotated. Alternatively, the plurality of slits can be positioned with respect to one another such that two or more of the slits at a given time can each be simultaneously illuminated with a different line of light from the image 107 of the remote object 104. FIG. 3C shows a depiction of a disk $302_1$ for hyperspectral imaging system 100b that includes multiple slits that are arranged so that portions of two slits are simultaneously illuminated by different portions of image 107. The two or more slits are positioned so that each is simultaneously within the field of illumination of the fore optic to achieve simultaneous illumination. At position $309_1$, for example, portions of each of slits $304a_1$ and $304a_2$ are simultaneously illuminated. Each of the simultaneously-illuminated portions passes a trimmed line of light corresponding to a different portion of image 107 to spectrometer 110 for dispersion to two-dimensional image sensor 112. The trimmed lines of light delivered from slits $304a_1$ and $304a_2$ are received by different sets of pixels contained within two-dimensional image sensor 112 and separate two dimensional images are formed from each of the trimmed lines of light. The present disclosure extends to adaptations of disk 302 that enable simultaneous illumination of three or more slits, or four or more slits, or five or more slits, etc. Such adaptations may be realized by adding additional slits to the groups of paired slits shown in FIG. 3C. Third slits $304a_3$, $304b_3$, $304c_3$ etc., for example could be added to the groups 304a, 304b, 304c etc. shown in FIG. 3C to achieve a disk in which portions of three slits are illuminated simultaneously. The widths and spacing between the multiple slits are adjusted so that the multiple slits fit within image 107. The two or more simultaneously-illuminated slits may be parallel. Further discussion of imaging of lines of light received from simultaneously-illuminated slits is provided hereinbelow.

Referring to FIG. 3D, there is a flowchart illustrating the steps of an exemplary method 300D for using the hyperspectral imaging system 100b to provide the hyperspectral image 102 of the two-dimensional area 107 of the remote object 104 in accordance with the second embodiment of the present invention. The method comprises the steps of: (a) providing the hyperspectral imaging system 100b which includes a fore optic with the optic(s) 106, the rotatable disk 302 (with multiple slits 304a, 304b, 304c, 304d, 304e, 304f, 304g, 304h, 304i, 304j (for example) formed therein), the actuator 306, the spectrometer 110 (which includes at least a dispersion device 116), the two-dimensional image sensor 112, and the controller 114 (step 302D); (b) positioning the optic(s) 106 to receive light 115a associated with the remote object 104 (step 304D); (c) controlling the actuator 306 such that the disc 302 is rotated so a first slit 304a (or plurality of first slits $304a_1$, $304a_2$, etc.) is positioned to allow a trimmed first line of light 315c (or plurality of trimmed first lines of light, one originating from each of simultaneously-illuminated slits) associated with the remote object 104 to pass there through to the spectrometer 110 comprising at least the dispersion device 116 configured to receive the trimmed first line of light 315c (or plurality of trimmed first lines of light, one originating from each of simultaneously-illuminated slits) and output a dispersed first line of light 315e (or plurality of dispersed first lines of light) to the two-dimensional image sensor 112 (step 306D); (d) obtaining a first two dimensional image 117a of the dispersed first line of light 315e (or plurality of dispersed first lines of light) from the two-dimensional image sensor 112 (step 308D); (e) controlling the actuator 306 such that the disc 302 is rotated so a second slit 304b (or plurality of second slits $304b_1$, $304b_2$, etc.) is positioned to allow a trimmed second line of light 315g (or plurality of trimmed second lines of light, one originating from each of simultaneously-illuminated slits) associated with the remote object 104 to pass there through to the spectrometer 110 comprising at least the dispersion device 116 configured to receive the trimmed second line of light 315g (or plurality of trimmed second lines of light, one originating from each of simultaneously-illuminated slits) and output a dispersed second line of light 315i (or plurality of dispersed second lines of light) to the two-dimensional image sensor 112 (step 310D); (f) obtaining a second two dimensional image 117b of the dispersed second line of light 315g (or plurality of dispersed second lines of light) from the two-dimensional image sensor 112 (step 312D); and (g) repeatedly controlling the actuator 306 such that the disc 302 is rotated so different slits 304c, 304d, 304e, 304f, 304g, 304h, 304i, 304j (for example) (or different pluralities of simultaneously-illuminated slits) are positioned to allow different lines of light associated with the light 107 of the remote object 105 to pass there through while repeatedly obtaining two dimensional images 117c, 117d, 117e, 117f, 117g, 117h, 117i, 117j of the different dispersed lines of light from the two-dimensional image sensor 112 and combining the first and second two dimensional images 117a and 117b and the different two dimensional images 117c, 117d, 117e, 117f, 117g, 117h, 117i, 117j to provide the hyperspectral image 102 of the two-dimensional area of the remote object 104 (step 314D). In one example, the controller 114 can control the actuator 306 to rotate the disk 302 at a continuous constant speed while obtaining the first and second two dimensional images 117a and 117b and the different two dimensional images 117c, 117d . . . 117n. In the above example, the controller 114 may include a processor that interfaces with a memory which stores processor-executable instructions to execute those processor-executable instructions to perform steps 304D, 306D, 308D, 310D, 312D, and 314D. The method of the present disclosure extends to methods that include less than all of the steps shown in FIG. 3D. Methods including subsets of any one, two, three or more steps shown in FIG. 3D are within the scope of the present disclosure.

If desired, the scanning disk 302 and actuator 306 could be added to existing designs without significant impact to the system's size. Plus, the resulting enhanced system (i.e., the hyperspectral imaging system 100b) would provide close to 100% scan efficiency. Other traditional scanning systems like galvo driven scanners that incorporate a scan mirror in front of the fore optic, requires feedback from a scan device to know which line in the remote object is being passed to the spectrometer. However, in the hyperspectral imaging system 100b if the two-dimensional image sensor 112 is large enough to image the zero order image and the diffracted image then the location of the zero order image can provide this information (i.e., which line in the remote object is being passed to the spectrometer) without requiring feedback from some scan device. Additionally, the traditional galvo driven scanners are a source of vibration and can have higher power requirements when compared to the constant speed rotational disk 302 used in the hyperspectral imaging system 100b. Further, traditional polygon scanners would typically have poor scan efficiency, additional reflective surfaces, and when positioned between the fore optic and the remote object would require a significant increase in system size when compared to the size of the hyperspectral imaging system 100b. In the present invention, the disk 302 could be produced with conventional lithographic techniques (chrome on glass for a visible-short wave infrared (SWIR) application as an example). The disk 302 could also be produced in a metal substrate using the processes defined in the co-assigned U.S. Pat. No. 7,697,137 (the contents of which are incorporated by reference herein). Finally, the disk 302 would be driven by a simple motor 306 (actuator 306) and no speed control or angular position device is required. However, the axial position of the disk 302 needs to be nominally controlled and positioned to be within the depth of focus of the optic(s) 106.

Figure 4D:
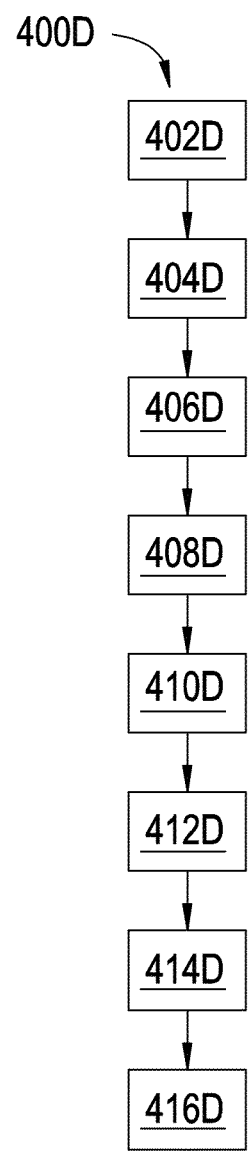
FIG. 4D is a flowchart illustrating the steps of an exemplary method for providing a hyperspectral image of a two-dimensional area of a remote object using the hyperspectral imaging system shown in FIGS. 4A-4B in accordance with the third embodiment of the present invention.
Figure 4B:
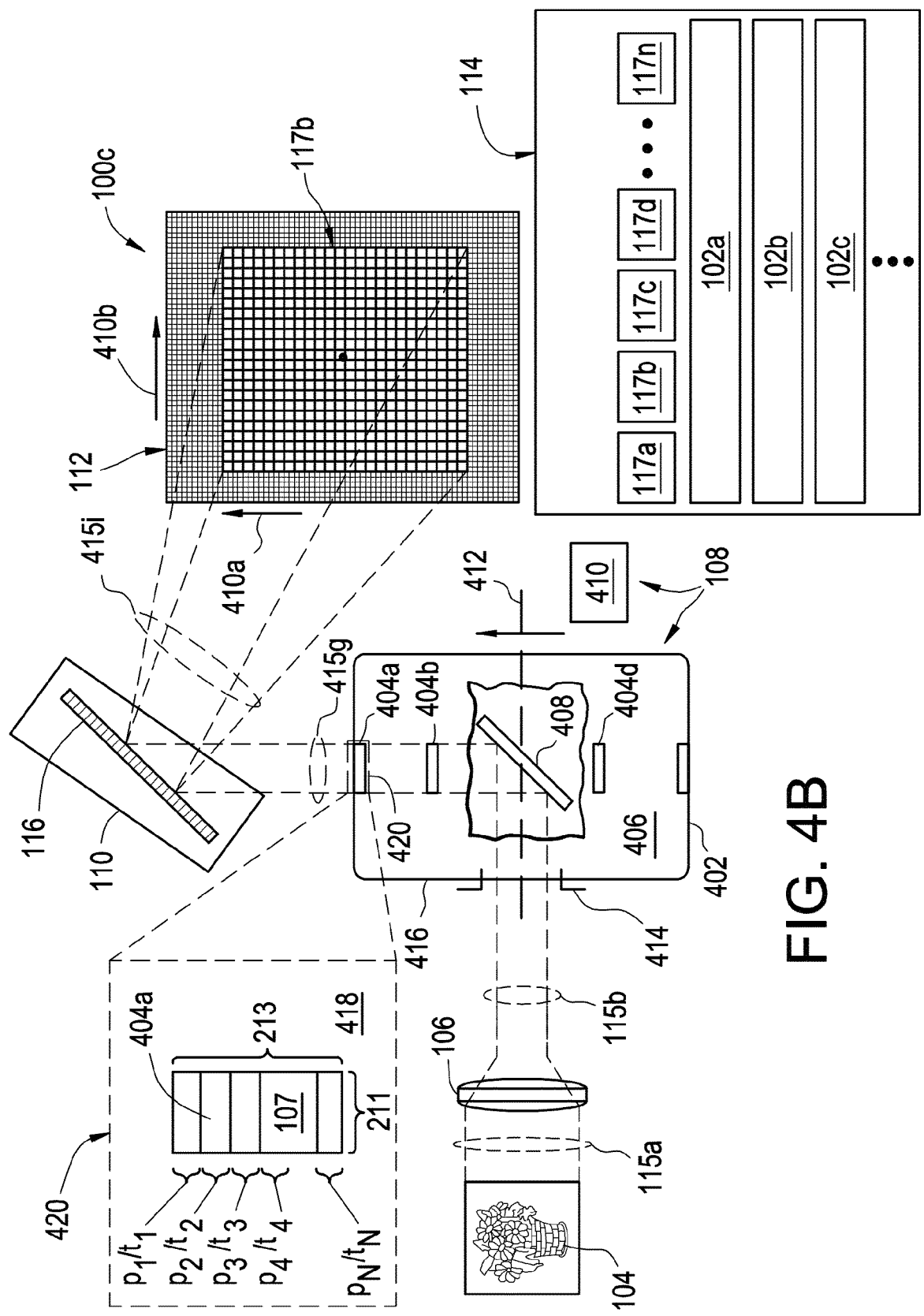

Referring to FIGS. 4A-4B, there are several diagrams illustrating the hyperspectral imaging system 100c in which the scannable slit mechanism 108 is a drum 402 with a at least one slit 404 (several slits 404a, 404b, 404c, 404d and 404e can be seen in this example) in a surface 406 thereof and a fold mirror 408 located therein, and an actuator 410 that rotates the drum 402 about axis 412. (Note: FIGS. 4A-4B have a portion of the surface 406 cut-away so one can see the fold mirror 404 located within an interior of the drum 402). Slit 404 or slits 404a, 404b, etc. may be straight or arcuate. The hyperspectral imaging system 100c includes a fore optic with optic(s) 106, the rotatable drum 402, the actuator 410, the spectrometer 110 (which includes at least a dispersion device 116), the two-dimensional image sensor 112, the controller 114, and the housing 118 (not shown). It should be appreciated that the optic(s) 106, the drum 402, the spectrometer 110 (dispersion 116), and the two-dimensional image sensor 112 would be positioned with respect to one another such that the light rays would be properly directed from one component to another component. As such, the rotating drum 402 would have an opening 414 on one side 416 thereof which the light 115b from the optic(s) 106 passes and is reflected by the fold mirror 408 to form an image 107 of the remote object 104 on an inner portion 418 of the surface 406. The inner portion 418 of the surface 406 may be positioned at an image plane of the optic(s) 106 (see exploded view 420 in FIGS. 4A and 4B).

As shown in FIGS. 4A-4B, there is an example where the hyperspectral imaging system 100c is configured such that the rotating drum 402 has one slit 404a in one position "p1" at a first time "t1" (see FIG. 4A) and then rotating drum 402 has the slit 404a in position "p2" at a second time "t2" (see FIG. 4B). In FIG. 4A, the hyperspectral imaging system 100c is positioned at the first time "t1" such that the optic(s) 106 receives light 115a associated with the remote object 104 and directs focused light 115b which represents an image 107 of the remote object 104 through the opening 414 on one side 416 of the rotating drum 402 to the fold mirror 408 which reflects the focused light 115b to form an image 107 of the remote object 104 on the inner portion 418 of the surface 406 (see exploded view 420) inside the rotating drum 402. In particular, the controller 114 would have interacted with the actuator 410 to rotate the drum 402 on the axis 412 such that the first slit 404a is in position "p1" at the first time "t1". At time "t1", the first slit 404a is positioned at or near an image plane of the optic(s) 106 so as to pass a trimmed first line of light 415c originating from a first portion of remote object 104 to the spectrometer 110 which is received by the dispersion device 116 by way of, for example, the first mirror 122 (see FIG. 1). The spectrometer 110 can be any well-known spectrometer 110 which has a dispersion device 116 (e.g., prism 116, diffraction grating 116). The dispersion device 116 generates dispersed light 415e which is received by the two-dimensional image sensor 112 by way of, for example, the second mirror 124 (see FIG. 1). The two-dimensional image sensor 112 generates a two-dimensional image 117a which includes one axis 410a representing the spatial information of the dispersed light 415e (e.g., the zero order image of a dispersed light 415e—if the diffraction grating 116 is used) and another axis 410b representing the spectral information of the dispersed light 115e (e.g., non-zero order images of the dispersed light 415e—if the diffraction grating 116 is used). The controller 114 receives and stores the two-dimensional image 117a and then interacts with the actuator 410 to rotate the drum 402 such that the first slit 404a is in position "p2" at time "t 2" to pass a trimmed second line of light 415g originating from a second portion of the remote object 104 to the spectrometer 110 as discussed next.

In FIG. 4B, the hyperspectral imaging system 100c is shown configured at the second time "t2" where the controller 114 interacted with the actuator 410 to rotate the drum 402 such that the first slit 404a is in position "p2" at time "t2" so as to pass a trimmed second line of light 115g associated with the image 107 of the remote object 104 into the spectrometer 110 which is received by the dispersion device 116 by way of, for example, the first mirror 122 (FIG. 1). As can be seen, the trimmed first line of light 115c is contiguous or substantially contiguous with the trimmed second line of light 115g associated with the image 107 of the remote object 104 so that trimmed second line of light 415g corresponds to an image of a portion of remote object 104 that is adjacent to the portion of remote object 104 associated with trimmed first line of light 415c. The dispersion device 116 generates dispersed light 415i which is received by the two-dimensional image sensor 112 by way of, for example, the second mirror 124 (FIG. 1). The two-dimensional image sensor 112 generates a two-dimensional image 117b which includes one axis 410a representing the spatial information of the dispersed light 415i (e.g., the zero order image of a diffracted light 415i—if the diffraction grating 116 is used) and another axis 410b representing the spectral information of the dispersed light 415i (e.g., non-zero order images of the diffracted light 415i—if the diffraction grating 116 is used). The controller 114 receives and stores the two-dimensional image 117b. Thereafter, the controller 114 interacts with actuator 410 to rotate the drum 402 at different times "t3", "t4" . . . "tn" so that the first slit 404a sequentially has positions "p3", "p4" . . . "pn" while at times "t3", "t4" . . . "tn" the two-dimensional image sensor 112 is activated to obtain different two-dimensional images 117c, 117d . . . 117n of the different dispersed lines of light of the remote object 104. The controller 114 may combine the two-dimensional images 117a, 117b, 117c . . . 117n to provide the hyperspectral image 102a of the entire image 107 associated with an area of the remote object 104. In this example, each two-dimensional image 117a, 117b, 117c . . . 117n corresponds to a different dispersed line of light 415e, 415i etc. . . . originating from different portions of remote object 104 and the dispersed lines of light 415e, 415i etc. . . . are contiguous with one another such than when their respective spectral images are combined the resulting combination forms the hyperspectral image 102a which represents the image 107 of an area of the remote object 104.

The same process which is used to obtain the hyperspectral image 102a of the area of the remote object 104 using the first slit 404a would be repeated to obtain a hyperspectral image 102b of an area of the remote object 104 using the second straight slit 404b and then repeated to obtain a hyperspectral image 102c of the area of the remote object 104 using the third straight slit 404c and so on. Hence, the drum 402 having "x" number of straight slits 404 enables "x" number of hyperspectral images 102 of the same image 107 of the area of the remote object 104 to be obtained per a single 360° rotation of the drum 402. The controller 114 can obtain the two-dimensional images 117a, 117b, 117c . . . 117n at any desired data rate, but typically it might be after the respective slit 404a, 404b, 404c and 404d has been rotated enough so that it's image (respective line of light from the image 107) on the two-dimensional image sensor 112 has moved laterally by at least one pixel.

In this example, the length of each of the slits 404a, 404b, 404c and 404d would be equal to or larger than a width 211 of the image 107 of the remote object 104. And, the widths of the slits 404a, 404b, 404c and 404d would dictate how many positions "p1", "p2", "p3" . . . "pn" and times "t1", "t2", "t3" . . . "tn" each slit 404a, 404b, 404c and 404d would have to be moved by rotating the drum 402 in order to account for the entire height 213 of the image 107 of the remote object 104. In other words, the widths of the slits 404a, 404b, 404c and 404d would dictate how many positions "p1", "p2", "p3" . . . "pn" and times "t1", "t2", "t3" . . . "tn" each slit 402a, 402b, 402c and 402d would have to be moved by rotating the drum 402 to enable all the contiguous lines of light 415c, 415g etc. . . . to pass there through such that when all the lines of lights 415c, 415g etc. . . . are combined they would encompass the entire image 107. It should also be appreciated that any number of slits 404 (only four are shown in FIGS. 4A and 4B) could be formed on the drum 402 and that the slits 404a, 404b, etc. can have the same or different widths and lengths.

In the aforementioned example depicted in FIGS. 4A and 4B, the slits 404a, 404b, 404c and 404d are separated from one another far enough such that the image 107 of the remote object 104 is located in only one of the slits 404a, 404b, 404c and 404d at any given time. In other words, the image 107 could be entirely located in space between the slits 404a and 404b, or between the slits 404b and 404c, or between the slits 404c and 404d etc. . . . . In this regard, the 2D image 107 formed by the fore optic with optic(s) 106 lies on the inner portion 418 of the drum 402 and for each angular position of the drum 402 the respective slit 404a (for example) only "passes" (trims) one line of the image 107 to the spectrometer 110. Based on the outer-diameter of the drum 402 and the size of the 2D image 107 to be scanned, the slits 404a, 404b, 404c and 404d will be angularly spaced from one another, such that when one slit 404a (for example) leaves the 2D field of view of the optic(s) 106, the next slit 404b (for example) is just entering the 2D field of view of the image 107. This results in 100% scan efficiency. In this situation, as the slit 404a (for example) traverses the focal plane of the optic(s) 106, it also moves in and out of focus. To address this problem, the drum 402 would ideally be large enough such that the slit 404a (for example) remains within the depth of focus of the optic(s) 106.

Figure 4C:
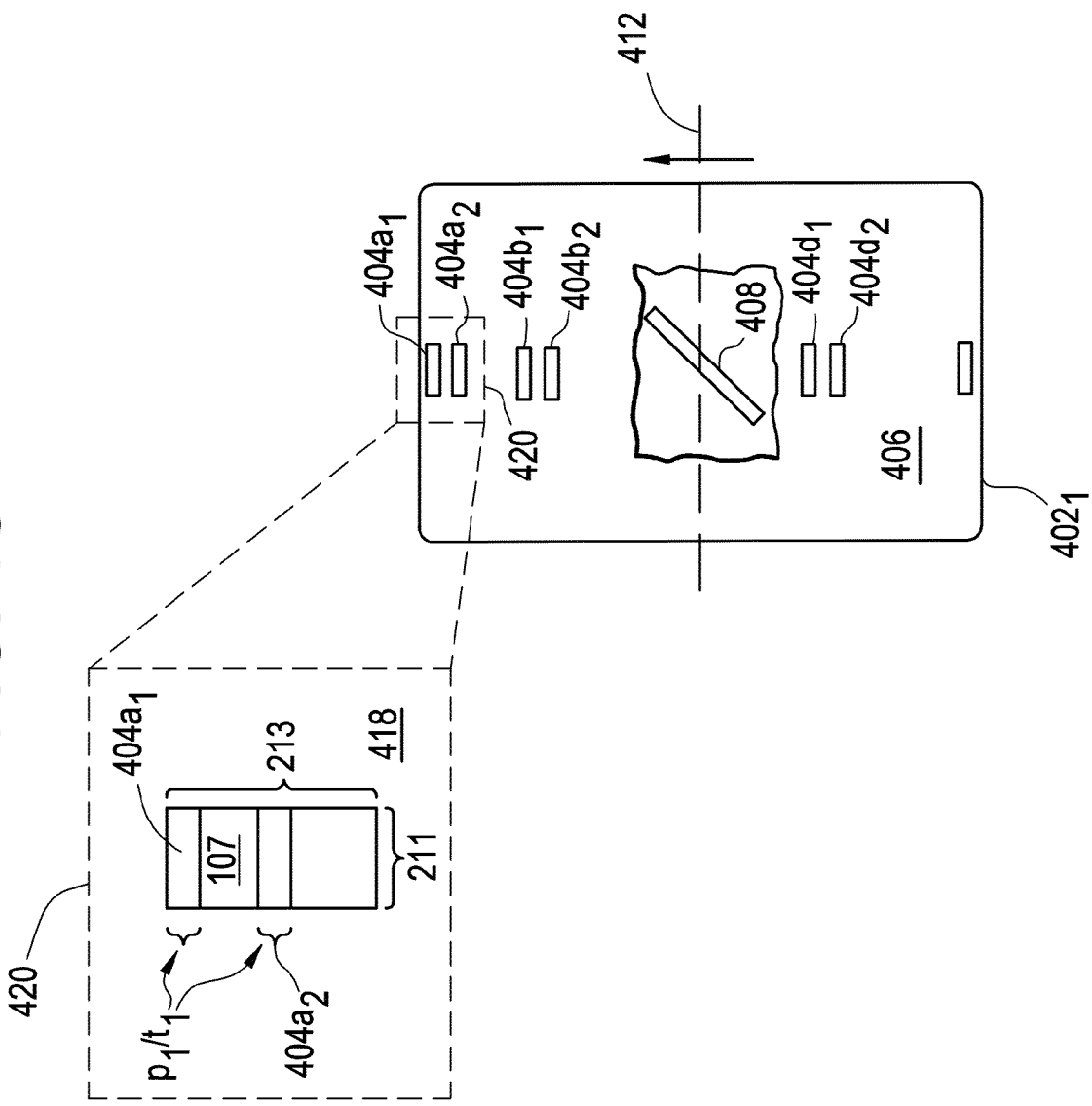
FIG. 4C depicts a drum for a scannable slit mechanism that provides for simultaneous illumination of two or more slits by the image reflected by the fold mirror contained within a drum of a hyperspectral imaging system.

In the depiction of FIGS. 4A and 4B, the plurality of slits is arranged so that only one slit at a time is illuminated as drum 402 is rotated. Alternatively, the plurality of slits on the drum can be positioned with respect to one another such that at least two of the slits at a given time are simultaneously illuminated by different lines of light from image 107, where the simultaneously-illuminated slits deliver different trimmed lines of light to the spectrometer 110 for dispersion to two-dimensional image sensor 112. The two or more spiral slits are positioned so that each is simultaneously within the field of illumination of the fore optic to achieve simultaneous illumination. FIG. 4C shows a depiction of a drum $402_1$ for hyperspectral imaging system 100c that includes multiple slits that are arranged so that portions of two slits are simultaneously illuminated by different portions of image 107. At position $p_1$ and time $t_1$, for example, portions of each of slits $404a_1$ and $404a_2$ are simultaneously illuminated (inset 418). Each of the simultaneously-illuminated slits passes a trimmed line of light corresponding to a different portion of image 107 to spectrometer 110 for dispersion to two-dimensional image sensor 112. The trimmed lines of light delivered from slits $404a_1$ and $404a_2$ are received by different sets of pixels contained within two-dimensional image sensor 112 and separate two-dimensional images are formed from each of the trimmed lines of light. The present disclosure extends to adaptations of drum 402 that enable simultaneous illumination of three or more slits, or four or more slits, or five or more slits, etc. Such adaptations may be realized by adding additional slits to the groups of paired slits shown in FIG. 4C. Third slits $404a_3$, $404b_3$, and $404d_3$, for example could be added to the groups 404a, 404b, and 404d shown in FIG. 4C to achieve a disk in which portions of three slits are illuminated simultaneously. The widths and spacing between the multiple slits are adjusted so that the multiple slits fit within image 107. The two or more simultaneously-illuminated slits may be parallel. Further discussion of imaging of lines of light received from simultaneously-illuminated slits is provided hereinbelow.

Referring to FIG. 4D, there is a flowchart illustrating the steps of an exemplary method 400D for using the hyperspectral imaging system 100c to provide the hyperspectral image 102 of the two-dimensional area 107 of the remote object 104 in accordance with the third embodiment of the present invention. The method comprises the steps of: (a) providing the hyperspectral imaging system 100c which includes the fore optic with optic(s) 106, the rotatable drum 402 (which has at least two slits 404a, 404b on a surface 406 thereof spaced such that they are simultaneously illuminated in at least one position of drum 402 and which has a fold mirror 408 located therein), the actuator 410, the spectrometer 110 (which includes at least a dispersion device 116), the two-dimensional image sensor 112, and the controller 114 (step 402D); (b) positioning the fore optic with optic(s) 106 to receive light 115a associated with the remote object 104 (step 404D); (c) positioning the drum 402 so that an opening 414 on one side 416 thereof is positioned to receive the light 115b from the optic(s) 106 and the fold mirror 408 is positioned to reflect the light 115b received from the optic(s) 106 towards the inner portion 418 of the surface 406, and where inner portion 418 of the surface 406 is positioned at an image plane of the optic(s) 106 (step 406D); (d) controlling the actuator 410 such that the drum 402 is rotated so at least two slits (e.g. $404a_1$, $404a_2$) are positioned to allow at least two trimmed first lines of light (e.g. $415c_1$ and $415c_2$) associated with the remote object 104 to simultaneously pass therethrough to the spectrometer 110 comprising at least the dispersion device 116, where the spectrometer 110 is configured to receive the at least two trimmed first lines of light (e.g. $415c_1$ and $415c_2$) and output at least two dispersed first lines of light (e.g. $415e_1$ and $415e_2$) to the two-dimensional image sensor 112 (step 408D); (e) obtaining at least two two-dimensional images (e.g. $117a_1$ and $117a_2$) of the at least two dispersed first lines of light (e.g. $415e_1$ and $415e_2$) from the two-dimensional image sensor 112, where the two two-dimensional images (e.g. $117a_1$ and $117a_2$) are received by different sets of pixels of two-dimensional image sensor 112 (step 410D); (f) controlling the actuator 410 such that the drum 402 is rotated so the at least two slits (e.g. $404a_1$ and $404a_2$) are positioned to allow at least two trimmed second lines of light (e.g. $415g_1$ and $415g_2$) associated with the remote object 104 to pass therethrough to the spectrometer 110 comprising at least the dispersion device 116, where the spectrometer 110 is configured to receive the at least two trimmed second lines of light (e.g. $415g_1$ and $415g_2$) and output at least two dispersed second lines of light (e.g. $415i_1$ and $415 i_2$) to the two-dimensional image sensor 112 (step 412D); (g) obtaining at least two two-dimensional images (e.g. $117b_1$ and $117b_2$) of the at least two dispersed second lines of light (e.g. $415i_1$ and $415i_2$) from the two-dimensional image sensor 112, where the two two-dimensional images (e.g. $117b_1$ and $117b_2$) are received by different sets of pixels of two-dimensional image sensor 112 (step 414D); and (h) repeatedly controlling the actuator 410 such that the drum 402 is rotated so the at least two slits (e.g. $404a_1$ and $404a_2$) are positioned to allow additional different lines of light associated with the light of the remote object 104 to pass there through while repeatedly obtaining additional two-dimensional images (e.g. $117c_1$ and $117c_2$, $117d_1$ and $117 d_2$ etc.) of the different dispersed lines of light received by the two-dimensional image sensor 112 and combining at least two of the two-dimensional images (e.g. two or more of $117a_1$, $117a_2$, $117b_1$, $117b_2$ etc.) to provide the hyperspectral image 102 of a two-dimensional area 107 of the remote object 104 (step 416D). In one example, the controller 114 can control the actuator 410 to rotate the drum 402 at a continuous constant speed while obtaining the at least two first two-dimensional images In the above example, the controller 114 may include a processor that interfaces with a memory which stores processor-executable instructions to execute those processor-executable instructions to perform steps 404D, 406D, 408D, 410D, 412D, 414D and 416D. The method of the present disclosure extends to methods that include less than all of the steps shown in FIG. 4D. Methods including subsets of any one, two, three or more steps shown in FIG. 4D are within the scope of the present disclosure.

Figure 5:
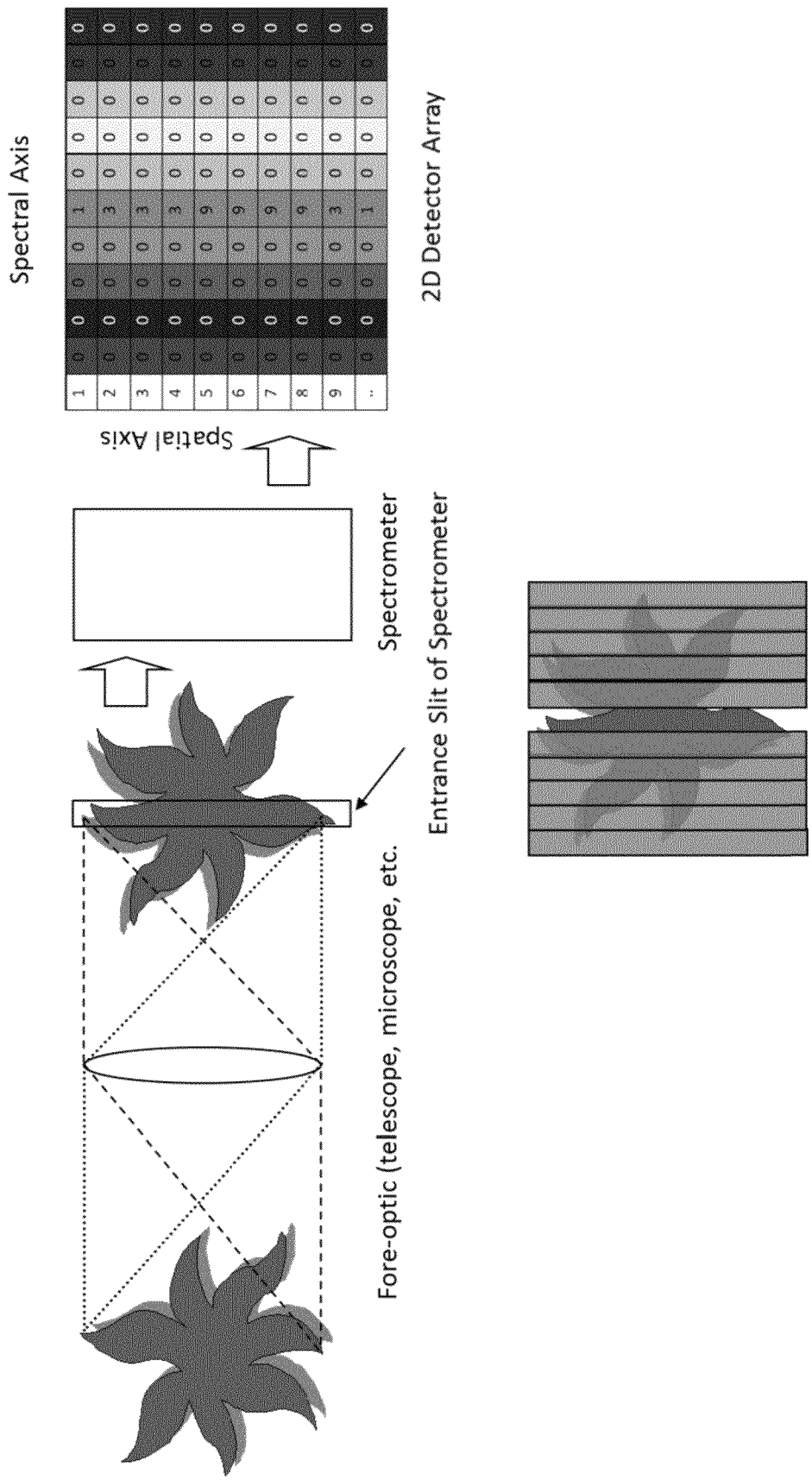
FIG. 5 depicts image acquisition from a remote object using a spectrometer with a single fixed slit.

The increase in the efficiency of image data gathering afforded by the hyperspectral imaging system with scannable slits of the present disclosure is illustrated in FIGS. 5-8. FIG. 5 shows an overview of a standard single-slit spectrometer. In a single-slit spectrometer, the fore optic images the object scene onto a fixed entrance slit of the spectrometer. The spectrometer disperses the trimmed image passing through the fixed entrance slit and directs it to a two-dimensional image sensor. The two-dimensional image sensor includes a two-dimensional array of pixels organized along a spatial axis and a spectral axis. In the depiction shown, the spectrometer slit is oriented in the vertical direction and the spatial axis of the two-dimensional image sensor is correspondingly depicted as vertical so that pixel position along the spatial axis correlates with position along the fixed entrance slit. Pixel position along the spectral axis correlates with distinct wavelength bands resolved by dispersion of the spectrometer. The top row of pixels, for example, may correspond to the upper-most position of the fixed entrance slit, where the different columns in the first row of pixel correspond to distinct wavelength intervals. The signal recorded by each pixel of the top row correlates with the intensity of light in the wavelength interval associated with the pixel that originates from the portion of the remote object imaged by the uppermost portion of the fixed entrance slit. The series of illuminated pixels in a row captures the full spectral range, as intensity across a series of continuous spectral intervals, emanating from the imaged portion of the remote object within the detection range of the two-dimensional image sensor. The remaining pixel rows of the two-dimensional image sensor record spectral intensity for portions of the remote object imaged by different vertical positions along the fixed entrance slit.

In FIG. 5, the portion of the remote object imaged by the fixed entrance slit is schematically illustrated in the lower part of the figure. The fixed entrance slit of the spectrometer has a rectangular shape and images a rectangular portion ("slice") of the remote object. The spectral intensity distribution of the imaged slice is recorded by the two-dimensional image sensor. The spectral intensity distributions at different vertical positions of the imaged slice are recorded by different rows of pixels. The numerical values listed for each pixel are a measure of the relative intensity of the trimmed line of light received from the spectrometer slit. The relative intensities are determined by the imaged slice of the remote object and are a function of position along the spectrometer slit and wavelength intervals associated with the columns. The characteristics of the remote object establish the pattern of relative intensity across the pixels of the two-dimensional image sensor. If the two-dimensional image sensor detects light in the visible portion of the spectrum, for example, the different columns of pixels detect wavelength intervals associated with different colors and the intensity recorded by the column correlates with the spectral intensity of the color received from the remote object. To create a hyperspectral image ("hyperspectral data cube" or "hypercube") with a spectrometer having a single fixed slit, a series of individual slit images must be acquired and combined. The traditional methods of acquiring the hypercube are pushbroom operation and use of a scanning mirror in the fore optic assembly. In the present disclosure, data acquisition is facilitated through acquisition of image data using multiple slits, a scanning slit mechanism, and better utilization of the pixel area available from two-dimensional image sensors.

Figure 6:
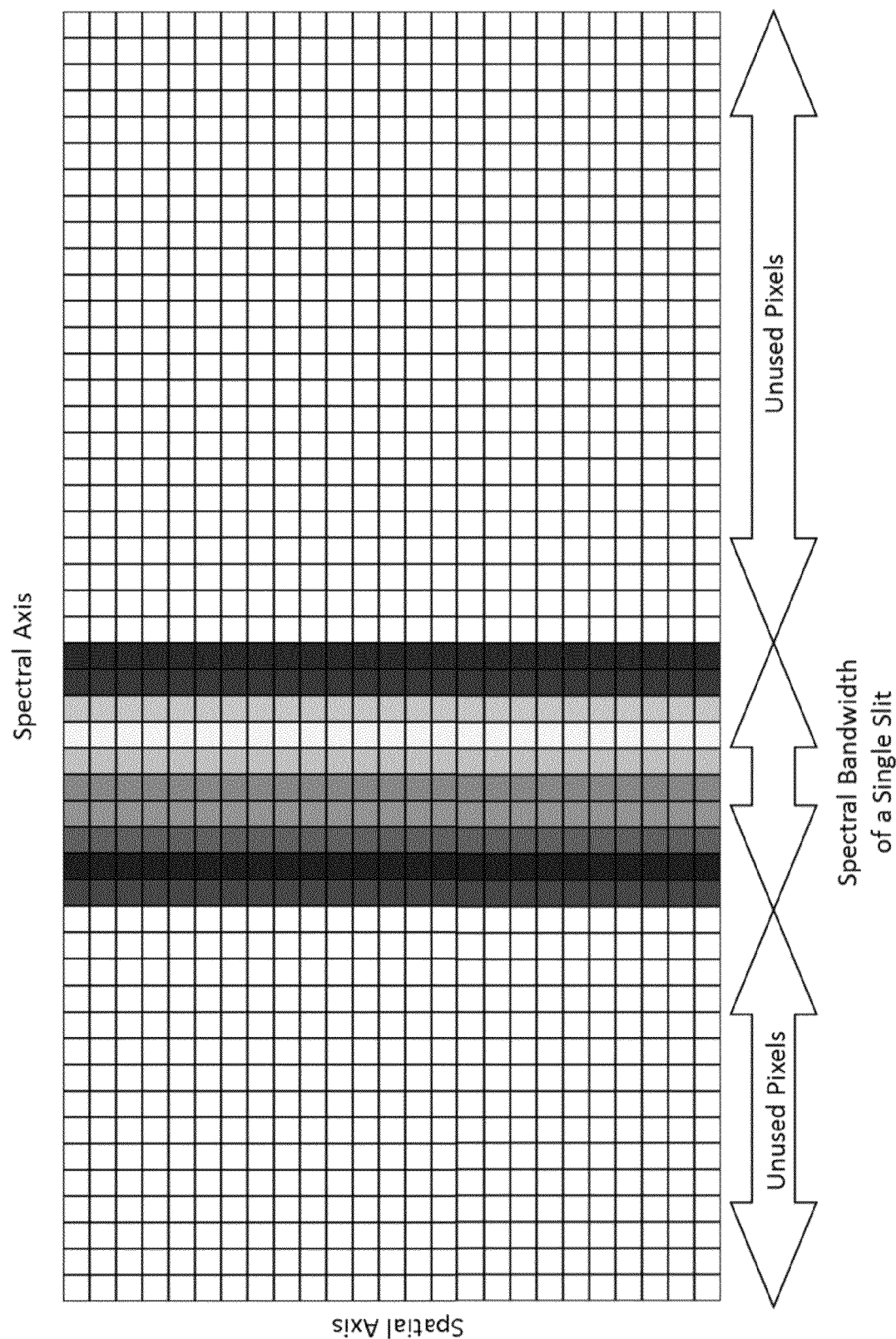
FIG. 6 depicts the underutilization of detector pixel area associated with image acquisition using a spectrometer with a single fixed slit.

FIG. 6 illustrates the underutilization in detection area associated with commercially-available two-dimensional image sensors. The number of pixel columns needed to image the spectral bandwidth within the detection range of commercially-available two-dimensional image sensors is much lower than the total number of columns available. As indicated in FIG. 6, a large number of pixel columns remain unutilized in hyperspectral imaging applications.

Figure 7:
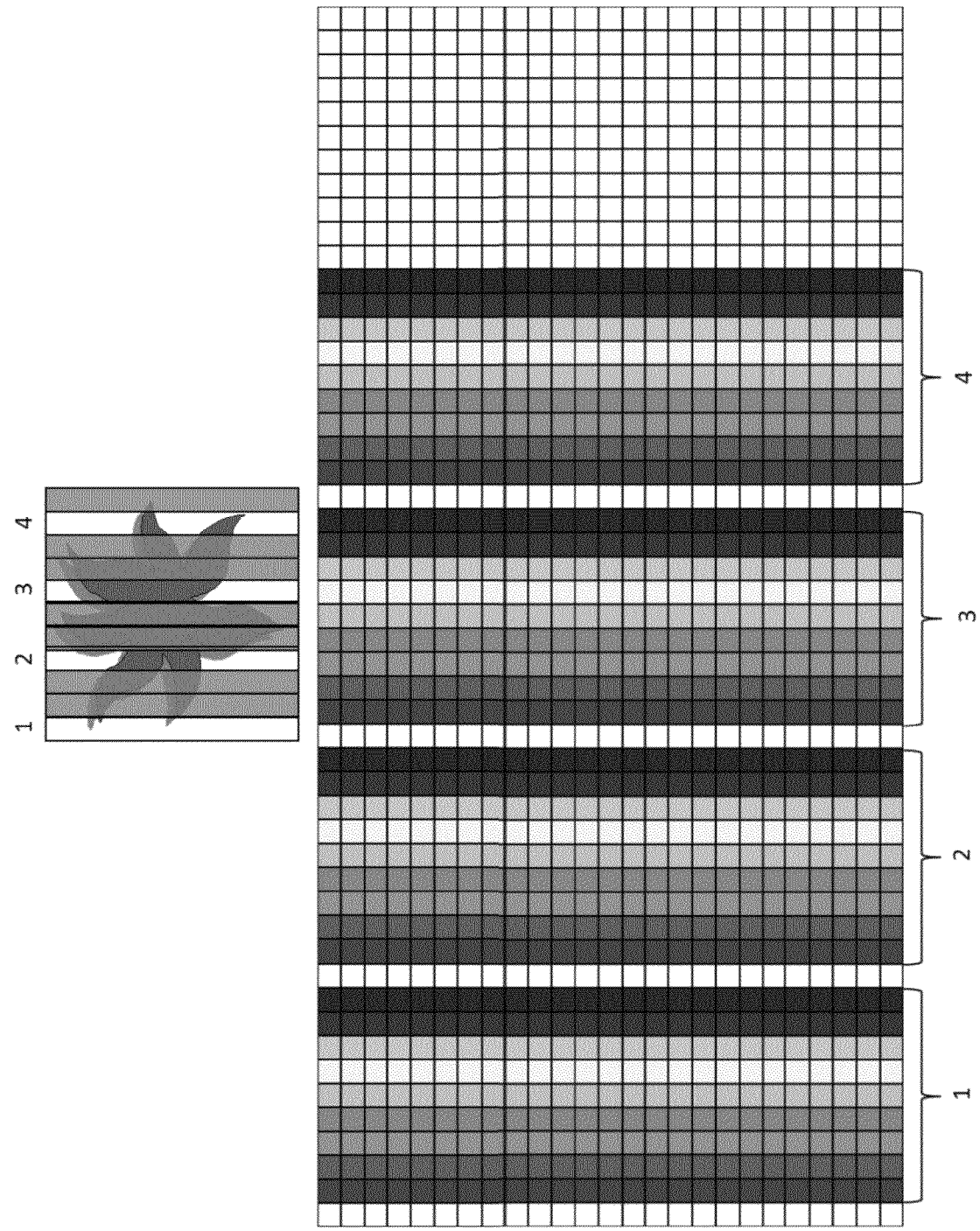
FIG. 7 depicts image acquisition from a remote object using a spectrometer with four fixed slits.

Greater utilization of pixels is realized in hyperspectral imaging systems that employ multiple fixed slits. FIG. 7 illustrates pixel utilization of a hyperspectral imaging system with four fixed slits. The four portions of the remote object imaged by the four slits are indicated by number in the upper portion of FIG. 7. The lower portion of FIG. 7 shows the pixel columns associated with the spectral bandwidth originating from each of the four slits. The four slits are physically positioned to utilize non-overlapping pixel columns of the two-dimensional image sensor. Images originating from the four slits are acquired simultaneously. Overall utilization of the pixels and image collection efficiency is improved relative to the single-fixed-slit configuration depicted in FIG. 6. Using multiple fixed slits permits a reduction in acquisition time needed to create a complete image by a factor equal to the number of slits used. With four slits, for example, the spatial and spectral data obtained in one acquisition time period is four times greater relative to a single slit and the acquisition time needed to obtain a complete image is reduced by a factor of four.

Figure 8:
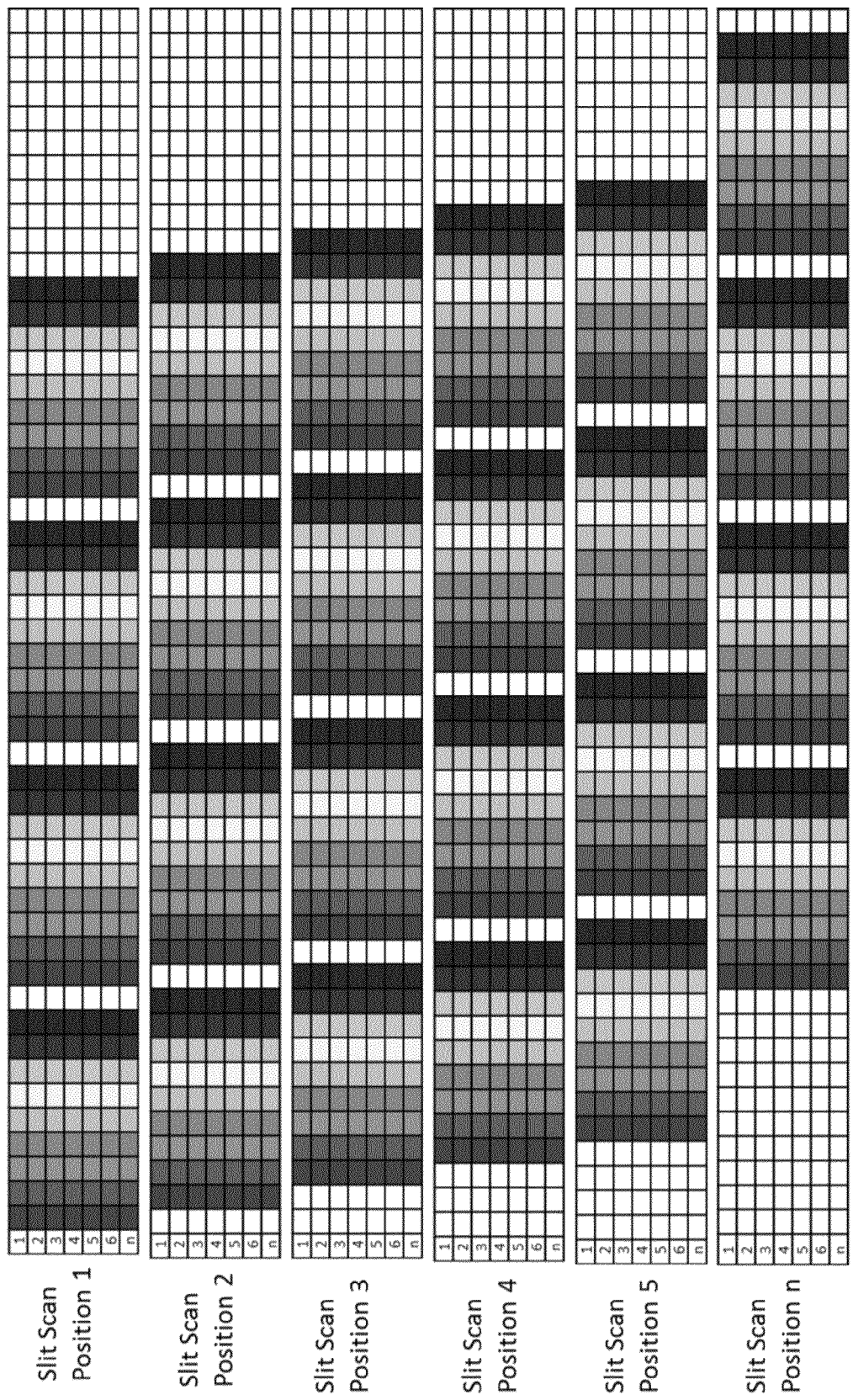
FIG. 8 depicts image acquisition from a remote object using a spectrometer with four scannable slits.

FIG. 8 illustrates a further increase in image collection efficiency available from the hyperspectral imaging systems of the present disclosure. FIG. 8 shows the pixel utilization for a hyperspectral imaging system with four slits, each of which is scannable. The top panel of FIG. 12 shows the distribution of spectral intensity associated with the images acquired from each of the four slits at a first slit position. Each of the four slits images a different portion of the remote object as described hereinabove. The images are detected and recorded by the two-dimensional image sensor. When image acquisition at the first slit position is completed, the scanning mechanism initiates a repositioning of each of the four slits to a second position and a second set of four images is acquired and recorded (second panel of FIG. 8). Each of the repositioned slits images a portion of the remote object that differs from the portion it imaged at the first slit position. Line images of eight different portions of the remote are acquired by the hyperspectral imaging system between the first and second positions of the four scannable slits. The increased image collection capacity occurs without physical movement of the hyperspectral imaging system and without a scannable mirror or other scannable optic upstream of the fore optic. The remaining panels of FIG. 8 illustrate additional images acquired by further repositioning of the four slits. The hyperspectral imaging system with scannable slit mechanism as disclosed herein provides efficient large area imaging of remote objects in an acquisition time that is far shorter than is possible with imaging systems with one or more fixed slits or a single scanning slit.

Although multiple embodiments of the present invention have been illustrated in the accompanying Drawings and described in the foregoing Detailed Description, it should be understood that the invention is not limited to the disclosed embodiments, but is capable of numerous rearrangements, modifications and substitutions without departing from the invention as set forth and defined by the following claims. It should also be noted that the reference to the "present invention" or "invention" used herein relates to exemplary embodiments and not necessarily to every embodiment that is encompassed by the appended claims.

The invention claimed is:

1. A hyperspectral imaging system comprising:
a fore optic configured to receive an image from a remote object, said image including a plurality of lines of light; and
a scannable slit mechanism that includes a first slit and a second slit, said first slit and said second slit being positioned so that said fore optic projects said image to simultaneously illuminate said first slit and said second slit, said first slit receiving a first line of light from said fore optic and outputting a trimmed first line of light, said second slit receiving a second line of light from said fore optic and outputting a trimmed second line of light, said first line of light originating from a first portion of said remote object and said second line of light originating from a second portion of said remote object; and
a spectrometer with dispersing device, said spectrometer positioned to receive and disperse said trimmed first line of light to produce a dispersed first line of light, said spectrometer positioned to receive and disperse said trimmed second line of light to produce a dispersed second line of light; and
a two-dimensional image sensor with a plurality of detection elements, said two-dimensional image sensor positioned to receive said dispersed first line of light over a first set of said detection elements and to receive said dispersed second line of light over a second set of said detection elements, said two-dimensional image sensor configured to obtain a two-dimensional image of said dispersed first line of light and a two-dimensional image of said dispersed second line of light; and
an actuator configured to reconfigure said scannable slit mechanism, said reconfiguration including repositioning said first slit and said second slit, said first slit and said second slit remaining continuously and simultaneously illuminated by said image during said repositioning, said repositioning situating said first slit to receive a third line of light from said fore optic and said second slit to receive a fourth line of light from said fore optic, said third line of light originating from a third portion of said remote object and said fourth line of light originating from a fourth portion of said remote object.

2. The hyperspectral imaging system of claim 1, wherein said first slit and said second slit are positioned at a focal plane of said fore optic.

3. The hyperspectral imaging system of claim 1, wherein said first slit and said second slit are arcuate or spiral in shape.

4. The hyperspectral imaging system of claim 1, wherein said first slit and said second slit are straight in shape.

5. The hyperspectral imaging system of claim 1, wherein said first slit and said second slit are parallel to each other.

6. The hyperspectral imaging system of claim 1, wherein said scannable slit mechanism includes a disk, said disk having said first slit and said second slit formed therein, said reconfiguration including rotating said disk.

7. The hyperspectral imaging system of claim 1, wherein said scannable slit mechanism includes a drum, said drum having a surface, said first slit and said second slit being formed in said surface, said druid including a reflective surface in the interior thereof, said reflective surface positioned to receive said image projected by said fore optic and reflect said image to said surface to simultaneously illuminate said first slit and said second slit.

8. The hyperspectral imaging system of claim 1, wherein said dispersing device is a grating.

9. The hyperspectral imaging system of claim 1, wherein said first set of detection elements and said second set of detection elements are non-overlapping.

10. The hyperspectral imaging system of claim 1, wherein said first portion of said remote object and said third portion of said remote object are contiguous.

11. The hyperspectral imaging system of claim 1, wherein said scannable slit mechanism includes a third slit and a fourth slit.

12. The hyperspectral imaging system of claim 11, wherein said scannable slit mechanism includes a disk having said first slit, said second slit, said third slit and said fourth slit formed therein; said disk having a edge; said first slit, said second slit, said third slit, said fourth slit being respectively positioned at a first distance, a second distance, a third distance, and a fourth distance from said edge; said first distance, said second distance, said third distance, and said fourth distance differing from each other.

13. A method for obtaining a hyperspectral image comprising:
providing a hyperspectral imaging system comprising:
a fore optic;
a scannable slit mechanism having a first slit and a second slit;
a spectrometer with dispersing device;
a two-dimensional image sensor with a plurality of detection elements; and
an actuator; and
positioning said fore optic to acquire and project an image from a remote object, said image including a plurality of lines of light; and
controlling said actuator to operate said scannable slit mechanism to position said first slit and said second slit such that a first portion of said first slit and a first portion of said second slit are simultaneously illuminated by said projected image, said first slit being illuminated by a first line of light of said image and said second slit being illuminated by a second line of light of said image, said first line of light originating from a first portion of said remote object and said second line of light originating from a second portion of said remote object; and passing said first line of light through said first slit to said spectrometer, said spectrometer dispersing said first line of light and directing said dispersed first line of light to a first set of detection elements of said two-dimensional image sensor, said two-dimensional image sensor recording an image of said dispersed first line of light; and passing said second line of light through said second slit to said spectrometer;

said spectrometer dispersing said second line of light and directing said dispersed second line of light to a second set of detection elements of said two-dimensional image sensor, said two-dimensional image sensor recording an image of said dispersed second line of light; and controlling said actuator to reconfigure said scannable slit mechanism, said reconfiguration including repositioning said first slit and said second slit, said repositioning removing said first portion of said first slit and said first portion of said second slit from the field of illumination of said fore optic, said repositioning moving a second portion of said first slit and a second portion of said second slit into said field of illumination of said fore optic, said second portion of said first slit and said second portion of said second slit being simultaneously illuminated by said image projected by said fore optic, said second portion of said first slit receiving and passing a third line of light originating from a third portion of said remote object and said second portion of said second slit receiving and passing a fourth line of light from a fourth portion of said remote object.

14. The method of claim 13, wherein said third portion of said remote object is contiguous with said first portion of said remote object.

15. The method of claim 13, further comprising:
controlling said actuator to reconfigure said scannable slit mechanism, said reconfiguration including repositioning said first slit and said second slit, said repositioning removing said first slit and said second slit from the field of illumination of said fore optic.

16. The method of claim 15, wherein said scannable slit mechanism includes a third slit and a fourth slit, said reconfiguration further comprising repositioning said third slit and said fourth slit, said repositioning moving said third slit and said fourth slit into said field of illumination of said fore optic.

17. The method of claim 13, further comprising:
obtaining a hyperspectral image, said obtaining including combining said image of said dispersed first line of light and said image of said dispersed second line of light.

18. The method of claim 13, further comprising:
controlling said actuator to repeatedly reposition said first slit and said second slit.

19. A hyperspectral imaging system comprising:
a fore optic configured to receive an image from a remote object, said image including a plurality of lines of light;
a scannable slit mechanism that includes a first slit and a second slit, said first slit and said second slit being arcuate or spiral in shape, said first slit and said second slit being positioned so that said fore optic projects said image to simultaneously illuminate said first slit and said second slit, said first slit receiving a first line of light from said fore optic and outputting a trimmed first line of light, said second slit receiving a second line of light from said fore optic and outputting a trimmed second line of light, said first line of light originating from a first portion of said remote object and said second line of light originating from a second portion of said remote object;

a spectrometer with dispersing device, said spectrometer positioned to receive and disperse said trimmed first line of light to produce a dispersed first line of light, said spectrometer positioned to receive and disperse said trimmed second line of light to produce a dispersed second line of light;

a two-dimensional image sensor with a plurality of detection elements, said two-dimensional image sensor positioned to receive said dispersed first line of light over a first set of said detection elements and to receive said dispersed second line of light over a second set of said detection elements, said two-dimensional image sensor configured to obtain a two-dimensional image of said dispersed first line of light and a two-dimensional image of said dispersed second line of light; and an actuator configured to reconfigure said scannable slit mechanism, said reconfiguration including repositioning said first slit and said second slit.

20. The hyperspectral imaging system of claim 19, wherein said first slit and said second slit are positioned at a focal plane of said fore optic.

21. The hyperspectral imaging system of claim 19, wherein said first slit and said second slit are parallel to each other.

22. The hyperspectral imaging system of claim 19, wherein said scannable slit mechanism includes a disk, said disk having said first slit and said second slit formed therein, said reconfiguration including rotating said disk.

23. The hyperspectral imaging system of claim 19, wherein said scannable slit mechanism includes a drum, said drum having a surface, said first slit and said second slit being formed in said surface, said drum including a reflective surface in the interior thereof, said reflective surface positioned to receive said image projected by said fore optic and reflect said image to said surface to simultaneously illuminate said first slit and said second slit.

24. The hyperspectral imaging system of claim 19, wherein said actuator is configured to reposition said first slit and said second slit such that said first slit and said second slit remain continuously simultaneously illuminated by said image during said repositioning, said repositioning situating said first slit to receive a third line of light from said fore optic and said second slit to receive a fourth line of light from said fore optic, said third line of light originating from a third portion of said remote object and said fourth line of light originating from a fourth portion of said remote object.

* * * * *